United States Patent [19]
Bristor

[11] Patent Number: 6,018,342
[45] Date of Patent: Jan. 25, 2000

[54] AUTOMATICALLY GENERATED CONTENT-BASED HISTORY MECHANISM

[75] Inventor: David M. Bristor, Menlo Park, Calif.

[73] Assignee: Sun Microsystems, Inc., Palo Alto, Calif.

[21] Appl. No.: 08/497,805

[22] Filed: Jul. 3, 1995

[51] Int. Cl.[7] .................................................. G06F 15/00
[52] U.S. Cl. ..................... 345/354; 345/352; 395/825; 395/887; 707/3
[58] Field of Search ....................................... 395/326, 348, 395/352, 825, 887; 345/326, 348, 349, 352, 353, 354; 707/3-6, 102-104

*Primary Examiner*—Huynh Ba
*Attorney, Agent, or Firm*—James D. Ivey

[57] ABSTRACT

A history mechanism is provided in which user data, which represents signals generated by a user, are stored for subsequent recall and regeneration in a history database in one of two or more categories associated with two or more respective component symbols of the user data. For example, in one embodiment, user data includes alphabetic symbols and a respective category is formed for each letter of the alphabet. User data is parsed into components and stored in the history database in each category corresponding to the initial letter of each component of the user data since the initial letter of each component of the user data is prominent. The user recalls and regenerates the user data by selecting a category corresponding to a letter of the alphabet which is the initial letter of any component of the user data. The user then selects the previously generated user data from a list of previously generated user data classified under the selected category. By classifying previously generated user data based on the content of the user data, e.g., prominent symbols of the user data, previously generated user data is stored in a organizational structure without intervention by the user and independently of the user's particular subjective perspective of the user data being classified. By classifying the user data redundantly according to each of one or more components of the user data, reliance on any single component of the user data being particularly memorable or unique is avoided.

27 Claims, 15 Drawing Sheets

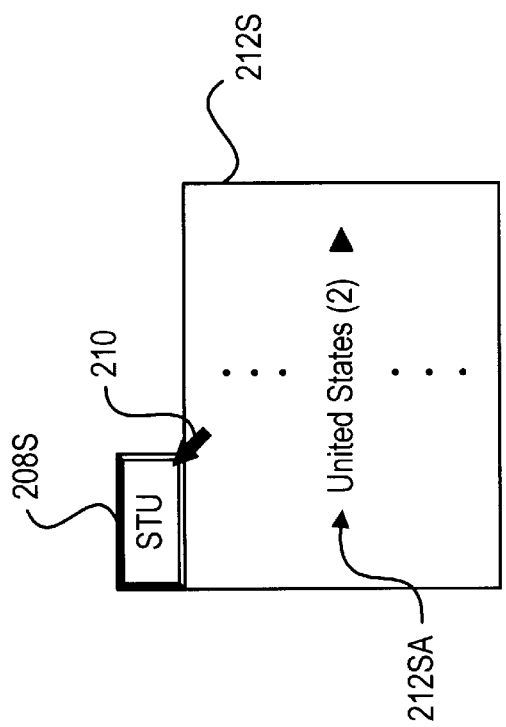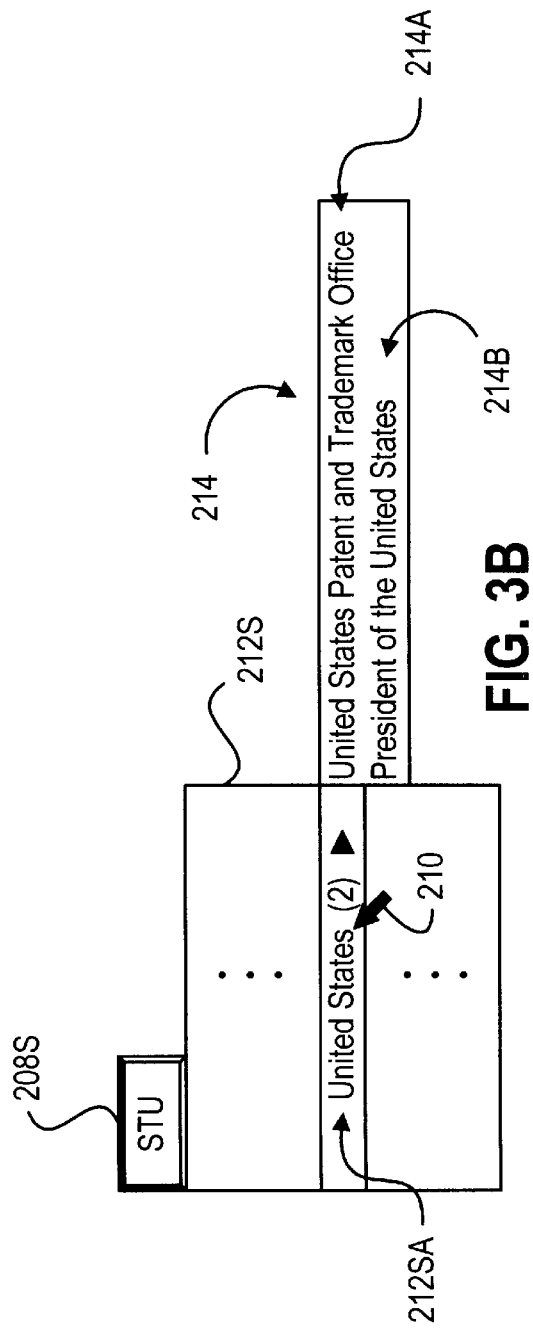

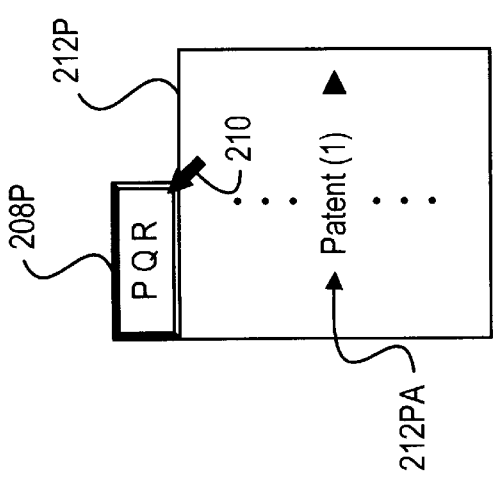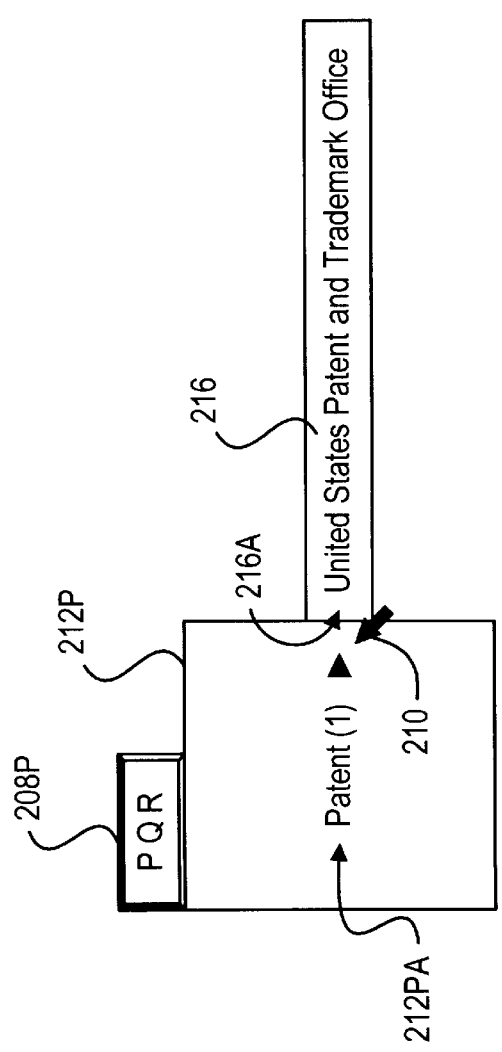

AUTOMATICALLY GENERATED CONTENT-BASED HISTORY MECHANISM

FIELD OF THE INVENTION

The present invention relates to computer user-interfaces and, in particular, to a user-interface in which a user can quickly and easily regenerate previously generated signals for transmission to a computer process.

BACKGROUND OF THE INVENTION

In computer user-interfaces, a user generates signals, e.g., using a keyboard or pointing device such as an electronic mouse, which are then transmitted to a computer system which processes the signals and takes action in accordance with the signals. The computer system typically converts the user-generated signals to data which conveys information to the computer system. Such data is referred to herein as "user data." Generation of signals by the user and conversion of those user-generated signals into user data are sometimes collectively referred to herein as "generating" the user data. For example, in a text-based, c-shell user-interface, signals are generated by the user pressing keys on a keyboard and into user data in the form of commands of the well-known c-shell. The c-shell user interface is a user interface computer process which is widely used and known. The c-shell user interface is most widely used in various implementations of the well known UNIX operating system. In response to the user data, the operating system, which is a computer process, processes the user data and performs operations in accordance with the received and processed user data.

In a graphics-based user-interface, the user can generate signals by identifying a graphical object displayed in a display device by manipulation of a pointing device and actuating the pointing device. In a graphical editor, such signals can cause the identified graphical object to be selected for graphical manipulation. In a navigation tool, such as a World Wide Web browser for the Internet global network, such signals can cause a document referenced by the identified object to be retrieved and displayed. Browsers are well known computer processes but are described briefly for completeness. A browser is a computer process which retrieves and displays information in accordance with command signals generated by a user. The user can determine which information to retrieve next based on previously retrieved and displayed information. Selecting information for retrieval and display based on previously retrieved and displayed information is generally referred to as navigation. In a navigation tool such as a World Wide Web browser, signals which are generated by the user manipulating a pointing device and which are received by the computer system are converted into user data which specifies information to be retrieved and displayed for the user.

In many such text and graphics based user-interfaces, history mechanisms are provided to enable the user to quickly and easily regenerate user data which have been previously generated. For example, the c-shell user-interfaces provides a history command. By invocation of the history command by the user, a number, e.g., 100, of the most recently entered c-shell commands are displayed with associated respective numerical identifiers. The following is an example of the display generated by invocation of the history c-shell command.

```
% history                    (1)
1 cd mydir
2 ls -Fl mystuff.*
3 print mystuff.*
4 lpq
5 history
%
```

It should be noted that the first character in commands 2 and 4 is a lower case "L" and not a numeral one or an upper case "I." In the example of textual output (1), the user generated as user data the commands listed as commands 1–5 immediately prior to entering the history command in response to the command prompt, i.e., the percent sign ("%"). The user can regenerate previously generated user data by prefixing a portion of a previously submitted command, or its associated numerical identifier, with a "bang" symbol ("!"). For example, if the user generates as user data the command "!3" (pronounced "bang three"), the c-shell user interface regenerates and processes the user data "print mystuff.*" since user data "print mystuff.*" is associated with the numerical identifier "3." Similarly, if the user generates as user data the command "!l" (pronounced "bang L"), the c-shell user interface regenerates and processes the user data "lpq" since the user data "lpq" is the most recently generated user data beginning with the letter "L." To distinguish command 2 from command 4 without reference to the numerical identifier of command 2, the user can generate "!ls" as the user data.

The history command and history mechanism provided by the c-shell user interface is not particularly useflul when hundreds of commands have been previously entered. For example, the user may recall from hundreds of previously entered commands one which references files "mystuff.*." In the c-shell history mechanism, the user must either also recall all of the letters preceding "mystuff.*" in the previously entered command of interest or must locate the previously entered command of interest in a list of hundreds of the previously entered commands. If the particular previously entered command was generated relatively recently, finding the previously entered command may require searching only a relatively few commands near the end of the history list since the history list provided by the c-shell user interface is organized chronologically. However, if a considerable number of commands have been entered subsequent to the entering of the particular previously entered command of interest, searching the chronologically ordered history list for the particular command can be difficult and time consuming.

Thus, the history command of the c-shell user interface becomes complicated and impractical when a large number of commands have been entered by the user. In general, chronological organization of a history list is a poor organization since the relative order in which commands are entered is frequently less memorable than the substantive content of the commands. As a result, users of the c-shell user interface frequently disregard the c-shell history mechanism and resort to manually regenerating and re-entering the command without reference to a previously entered command.

Other history mechanisms are used in text-based user interfaces similar to the c-shell user-interface. For example, some text-based user-interfaces allow the user to regenerate previously generated user data by pressing arrow keys on a keyboard. Specifically, the user presses an up arrow key at a command prompt to retrieve the most recently entered command. Pressing the up arrow key again retrieves the next most recently entered command. The user can retrieve any of a number of previously entered commands by repeatedly pressing the up arrow key. The retrieved previously entered command is displayed in a computer display device and the user can alter the retrieved command by pressing other keys on the keyboard. The retrieved command is regenerated by pressing the Enter key of the keyboard.

Another text-based history mechanism uses a hot key to regenerate previously generated user data specified by partial user data. For example, the user presses a few keys on a keyboard and then presses the hot key to regenerate user data whose initial few characters are specified by the pressed keys. The hot key can be, for example, meta-p which is generated by the user by pressing and holding a meta key while concurrently pressing the "p" key. A meta key can be, for example, any of the "Ctrl" and "Alt" keys of a standard keyboard used in workstation computers such as the SPARCstation workstation computer available from Sun Microsystems, Inc. of Mountain View, Calif.

In this history mechanism, a user enters one or more characters of a command and presses meta-p on the keyboard. In response, the computer process retrieves and displays the most recently entered command which begins with the one or more characters entered by the user. If the user presses meta-p again, the next most recently entered command beginning with the one or more characters entered by the user is retrieved and displayed. To retrieve and display a more recently entered command, the user presses meta-n on the keyboard. This history mechanism suffers from the same deficiencies as the history c-shell command described above in that the user must remember specifically the first few letters of the previously entered command and that the history is organized chronologically. As described above, the first few letters of a previously entered command may be neither unique nor memorable.

History mechanisms are also used in graphical user-interfaces (GUIs). For example, the Netscape browser available from Netscape Communications of Mountain View, Calif. which allows users to navigate the World Wide Web of the Internet includes two history mechanisms. In the context of a World Wide Web browser, user data generated by a user identify a particular document within the World Wide Web and the browser typically retrieves and displays the document in response to the user data. A World Wide Web browser and a document within the World Wide Web are sometimes referred to herein as a Web browser and a Web document, respectively. Web documents are common and well known but are described here briefly for completeness. A Web document can be a hypertext document and, like other types of hypertext documents, can include links to locations within the Web document or to other Web documents. Such links are generally represented graphically when the Web document is displayed. User data generated by a user typically specify the universal resource locator (URL) of a specific Web document. Typically, the user gestures to identify a graphical representation of a link within a first Web document to a second Web document. The identification by gesture of the graphical representation of the link generates and transmits to the Web browser engine as user data the URL of the second page.

The first history mechanism of the Netscape Web browser is a list of some of the most recently retrieved Web documents in reverse chronological order. The list is presented to the user as a list of items of a pull-down menu. The list includes the respective titles of the previously retrieved Web documents. The title of a Web document is specified within the Web document and does not always convey to a user the nature or content of the Web document. However, the title of a Web document does typically convey to the user more information about the Web document than does the URL of the Web document.

Closely related to the history list of the Netscape Web browser is the notion of moving backwards or forwards within previously retrieved Web documents. For example, the Netscape Web browser provides a "Back" command, which is accessible to the user either through a pull down menu or through a virtual "Back" button. A virtual button is a graphical representation in a computer display device of a button which can be pressed by appropriate manipulation of a pointing device, e.g., an electronic mouse. Virtual buttons are well known and are commonly used in various GUIs and are therefore not discussed further herein. The "Back" command, when issued by the user, retrieves and displays the Web document which immediately follows the currently displayed Web document in the history list, which is organized in reverse chronological order as described above. In response to issuance of a "Forward" command by the user, the WWW browser retrieves and displays the Web document which immediately precedes the currently displayed Web document in the history list. The "Forward" command is accessible to the user either through a pull down menu or through a virtual "Forward" button. By repeatedly issuing "Back" and/or "Forward" commands, the user can sequentially traverse the history list in either direction.

Chronological history lists in the context of hypertext documents, such as Web documents, become exceedingly complicated as a user navigates the various hypertext documents. The following example illustrates this limitation. Consider a hypertext document A with links to hypertext documents B, C, and D. Consider further that hypertext documents B, C, and D include links to (i) hypertext documents E, F, and G, (ii) hypertext documents H and I, and (iii) hypertext document J, respectively. A user specifies hypertext document A for retrieval and display and thereafter gestures to identify the link to hypertext document B to cause retrieval and display of hypertext document B. Identifying a link to cause retrieval and display of a document referenced by the link is generally referred to as "following" the link. The user follows the link within hypertext document B to hypertext document hypertext document F. At this point, the history list includes user data specifying hypertext documents A, B, and F. However, if the user determines that hypertext documents B and F are not of interest, the user can follow the history list back to hypertext document A. At this point, the history list includes user data specifying hypertext documents A, B, F, B, and A. The user can then follow a link to hypertext document D, causing the history list to include user data specifying hypertext documents A, B, F, B, A, and D. If the user repeatedly follows links to hypertext documents and then reverses the followed links as described above, the history list becomes cluttered with user data redundantly specifying various hypertext documents.

The Netscape Web browser avoids such redundant specification of hypertext documents by removing from the history list links which are subsequently followed in reverse by use of the "Back" command. In the above example, when the user follows links in reverse by use of the "Back" command to go back from hypertext document F to hypertext document B and back to hypertext document A and then follows the link to hypertext document D, specification of hypertext documents F and B are removed from the history list. Thus, the history list resulting from the above exemplary hypertext document navigation in the context of the Netscape Web browser includes user data specifying hypertext documents A and D. This approach, while avoiding redundant specification of hypertext documents, also avoids recording in the history mechanism previously retrieved hypertext documents. Thus, if the user later determines that hypertext document F is of interest, the user cannot use the history list to regenerate user data specifying hypertext document F for retrieval and display.

The second history mechanism provided by the Netscape Web browser involves the notion of virtual bookmarks. A virtual bookmark stores in a history database user data specifying a Web document which the user identifies as important. For example, when the user views a Web document retrieved and displayed by the Web browser, the user determines whether the Web document is one that the user is likely to want to see again. If the user determines that the user is likely to request retrieval and display of the Web document again, the user issues a command to the Web browser to store the URL and title of the currently displayed Web document in a structure of virtual bookmarks. The user can later regenerate user data specifying the Web document for retrieval and display by selecting the title of the Web document from the structure of virtual bookmarks. This mechanism has the advantage that only Web documents which are of interest are stored in the structure of virtual bookmarks. In addition, the Netscape Web browser provides a mechanism by which the user can organize the virtual bookmarks of the structure in any order. Furthermore, the user can include in the structure headers of multiple hierarchical levels to form a hierarchical structure and organize virtual bookmarks within the hierarchical structure.

The bookmark history mechanism of Web browsers suffers from a number of disadvantages. First, the user must anticipate which Web documents the user will want to retrieve and display at a later time. The user is not always blessed with such foresight. Accordingly, the desired Web document may not be found in the structure of virtual bookmarks. In addition, users typically save scores of virtual bookmarks, sometimes in excess of one hundred virtual bookmarks. To facilitate location of a particular virtual bookmark from the structure of bookmarks, the user must generally expend time and energy to categorize and organize saved virtual bookmarks. Such organization by one user is generally specific to that user's unique perspective of the various Web documents and the utility of the various Web documents. Therefore, a second user cannot always easily navigate the particular organization established by the first user. Furthermore, the mechanism by which a user organizes virtual bookmarks requires a level of skill beyond that required for simple navigation of the World Wide Web using the Web browser. Accordingly, novice users are sometimes intimidated by this mechanism and accordingly decline to save and organize virtual bookmarks. Even for users who can manage to organize saved virtual bookmarks, doing so requires time and effort which can be devoted to more important or rewarding pursuits.

Thus, conventional history mechanisms organize previously generated user data by chronology, by the first alphabetic character of the user data, or by an organization imposed upon the user data by the user. What is needed is a history mechanism in which previously generated user data can be easily and quickly located within a structure of previously generated user data. What is further needed is a system and method for automatically generating an organizational structure for storing previously generated user data to facilitate location of previously generated user data within the organizational structure without requiring the user to construct the organizational structure. What is farther needed is a history mechanism by which a user can recall and regenerate previously generated user data without requiring the user to recall the initial character or characters of the previously generated user data and without requiring the user to search for the previously generated user data in a chronological list of previously generated user data.

SUMMARY OF THE INVENTION

In accordance with the present invention, a history database includes two or more categories corresponding to two or more respective symbols which can be used to describe previously generated user data. For example, in one embodiment, user data includes alphabetic symbols and a respective category is formed for each letter of the alphabet. For example, a virtual button, when actuated by the user, displays all previously generated user data associated with a particular letter of the alphabet. User data are stored in the history database in one or more of the categories according to symbols used to describe the user data. In the same embodiment, the description of the user data is parsed into components and the user data is stored in the history database in each category corresponding to the initial letter of each component of the description of the user data. The initial letter of each component is selected as a categorization criteria since the initial letter of each component of the description of the user data is prominent to the user. For example, the c-shell command "ls -Fl allmystuff.* | more" is parsed into the components "ls," "allmystuff.*," and "more" and is made the item of respective menus associated with the letters "L," "A," and "M," respectively.

The user recalls and regenerates the user data by selecting a category corresponding to a letter of the alphabet which is the initial letter of any component of the description of the user data. For example, the user may wish to recall and regenerate the previously generated c-shell command "ls -Fl allmystuff.* | more." The user selects a category by actuating a virtual button associated with any of the letters "L," "A," and "M," for example. In response to actuation of a virtual button associated with the letter "A," a menu whose items are a number of previously generated user data having components whose initial is "A" (or "a") is displayed. The user then selects the previously generated user data by selecting the description of the previously generated user data from a list of descriptions of previously generated user data classified under the selected category. It is appreciated that, in some embodiments, the user data is self-describing such that the description of the user data is the user data itself. For example, the c-shell command "ls -Fl allmystuff.* | more" is self-describing to the person who entered the command using a keyboard and is categorized under the letter "A" as a result of the component "allmystuff.*." It is presumed that someone who manually enters a textual command using a keyboard does not require explanation with respect to the comnmand's meaning.

By classifying previously generated user data based on the content of the description of the user data, e.g., prominent symbols of the description of the user data, previously generated user data is stored in an organizational structure without intervention by the user and independently of the user's particular subjective perspective of the user data being classified. By classifying the user data redundantly according to each of one or more components of the description of the user data, reliance on any single component of the description of the user data being particularly memorable or unique is avoided.

BRIEF DESCRIPTION OF THE DRAWINGS

FIGS. 3A-B and 4A-B are screen views of a history menu and a secondary history menu in accordance with the present invention.

DETAILED DESCRIPTION

In accordance with the present invention, a history database includes two or more categories corresponding to two or more respective symbols of previously generated user data. User data are stored in and subsequently retrieved from the history database in one or more of the categories according to symbols of the user data. A symbol of specific user data is a symbol which, perhaps in combination with other symbols, describes the specific user data, i.e., to identifies the specific user data to a user. For example, a c-shell command is self-describing to the particular user who entered the command. Letters, numerals, and other characters of the standard ASCII character set included in a particular c-shell command are symbols of the c-shell command. In a second example, user data is a URL identifiing a particular Web document and is described by the title of the Web document. Since the title includes a number of alphanumeric characters, each of those alphanumeric characters is a symbol of the Web document. In a third embodiment, non-character symbols, such as graphical symbols and icons, describe user data. Such non-character symbols which describe specific user data are symbols of that specific user data. By classifying user data is a history database according to symbols of the user data, the user data can be categorized automatically and in accordance with the content of the description of the user data. Accordingly, the user can easily locate specific previously generated user data from a full, large, and relatively complex history database.

Figure 1A:
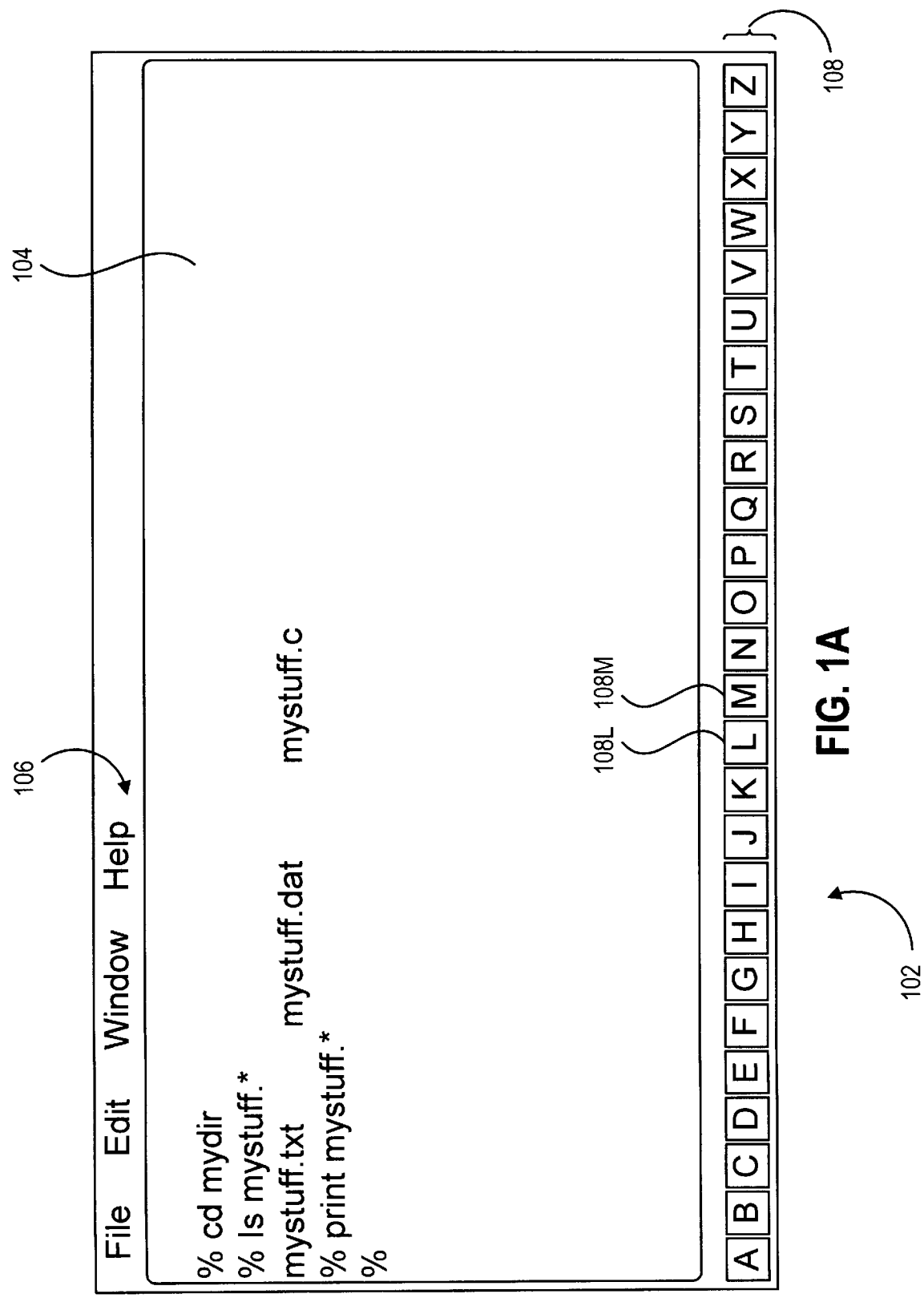
FIGS. 1A–C are views of respective portions of a computer display device of a computer system in which a history mechanism in accordance with the present invention is implemented.

FIG. 1A shows a window 102 which is displayed in a computer display device using conventional techniques. Window 102 includes a pane 104 in which a text-based user-interface is implemented. In a manner described more completely below, the user enters user data using a keyboard and those user data are represented in pane 104 of window 102. In addition, data generated by a computer system described more completely below in response to the user data are represented in pane 104 as well. Window 102 also includes a pull-down menu 106 by which the user enters command signals in a conventional manner.

Figure 1B:
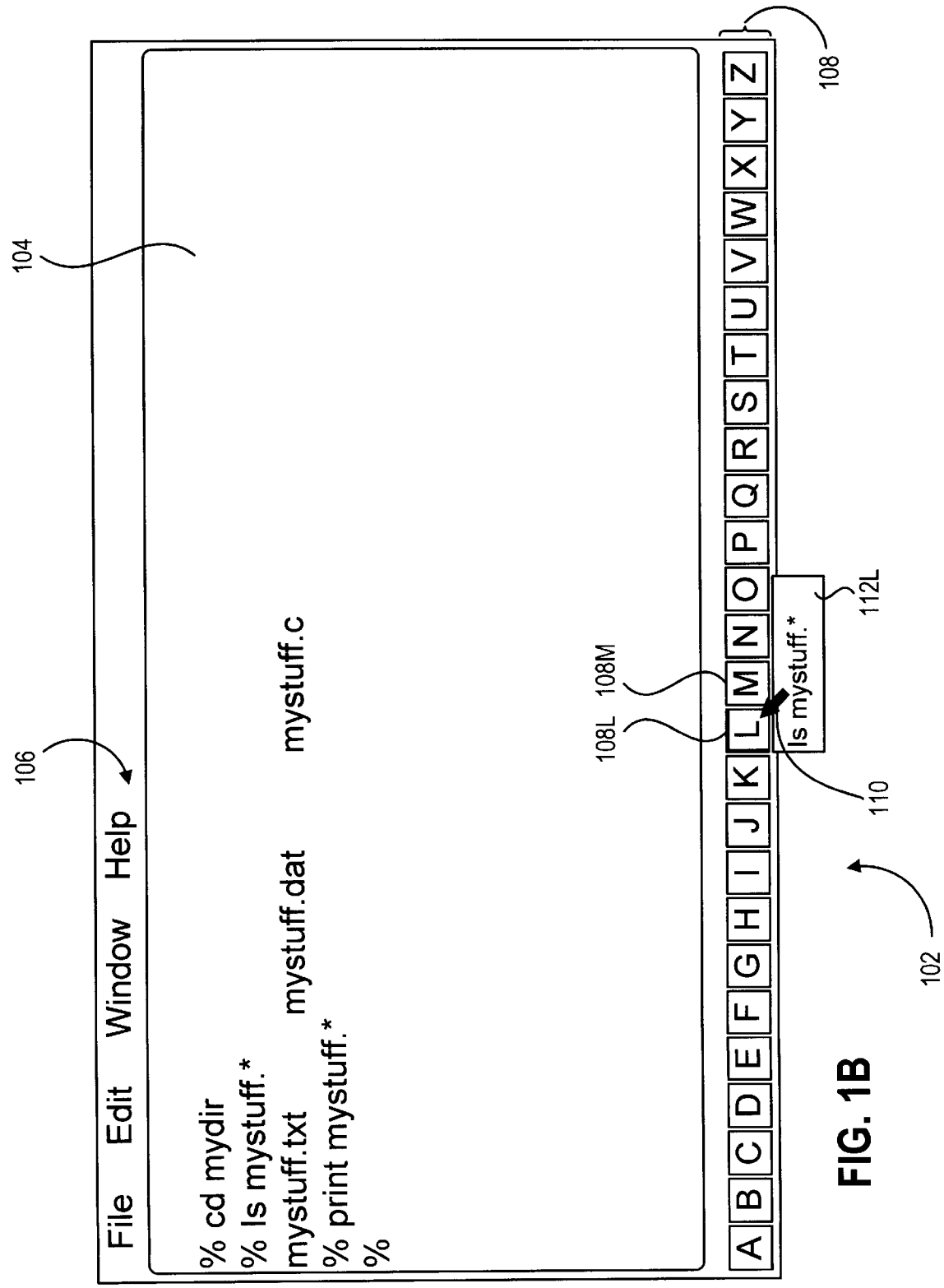
Figure 1C:
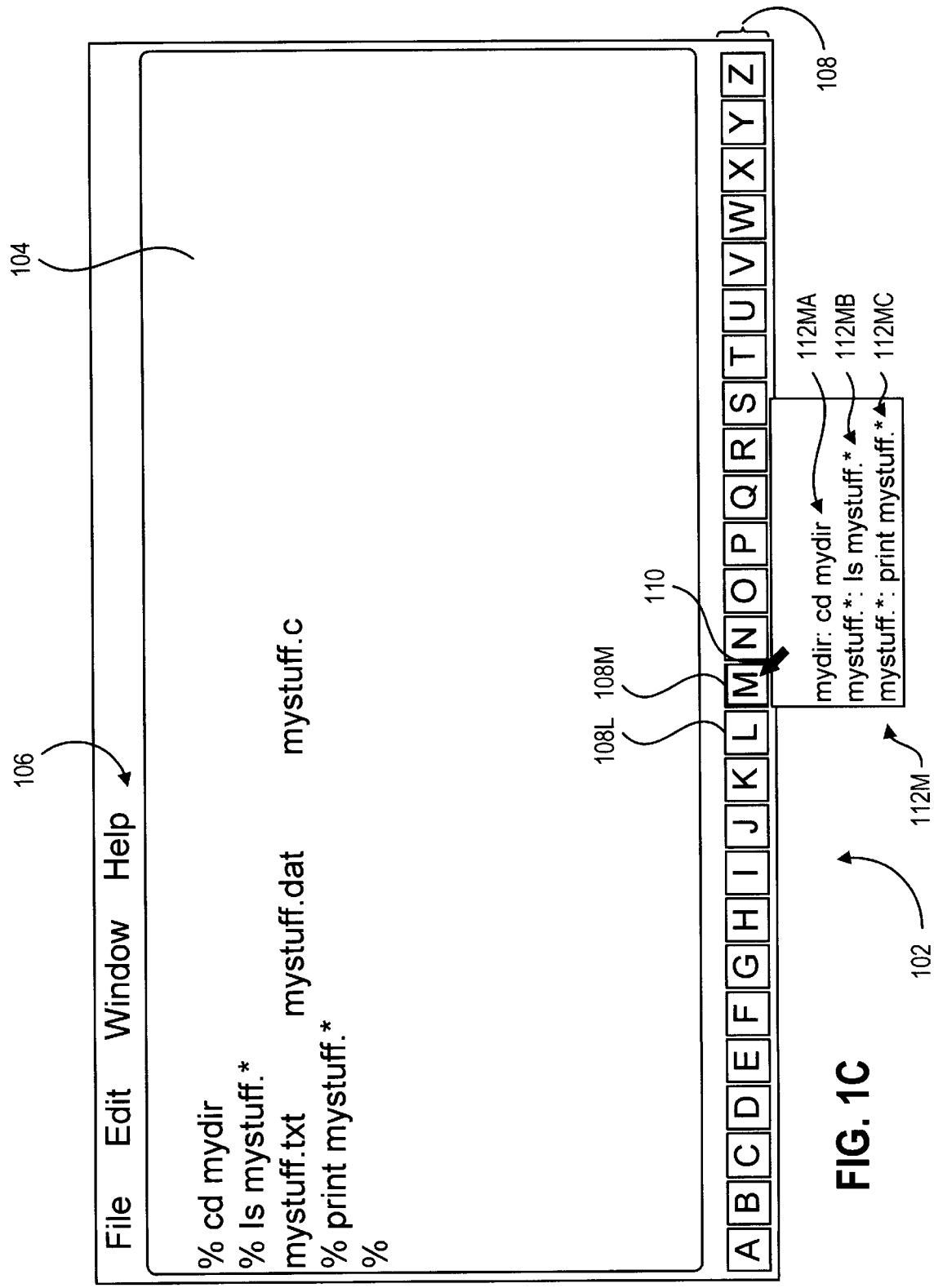

Window 102 also includes history buttons 108, each of which is a virtual button corresponding to a letter of the alphabet. For example, history buttons 108L and 108M correspond to the letters "L" and "M," respectively. In accordance with the present invention, an organization scheme which is symbolic and with which users are already familiar is used in a novel manner to categorize previously generated user data. In the embodiment of FIGS. 1A–C, which is sometimes referred to herein as a text-based implementation, the user data represent commands entered by the user and include letters of the alphabet, numerals, and other characters as symbolic components of the user data. Textual commands entered by a user are generally self-describing as the command entered by the user typically has clear meaning to the user. In this text-based implementation, the alphabet is a suitable organizational metaphor since most of the prominent symbols of such user data are letters of the alphabet. The most prominent symbols of such user data are typically the initial letters of various components of the user data. Initial letters of the components of the user data are therefore used for automatic categorization of the command according to the command's content. In addition, the alphabet is an organization with which users are generally familiar and therefore is a preferred organization in text-based implementations.

FIG. 1B shows the use of history button 108L by the user to retrieve previously entered user data categorized under the letter "L." The user places a cursor 110 over history button 108L and actuates history button 108L in a manner described more completely below. In response to actuation of history button 108L, history button 108L is redisplayed in the computer display device to be shown in a pressed state, and a history menu 112L, which corresponds to history button 108L, is displayed in the computer display device in proximity to history button 108L. History menu 112L includes all history entries categorized under the letter "L." As described more completely below, each command entered by the user is categorized under the initial letter of each component of the command. In the example of FIG. 1B, the only command which includes a component whose initial letter is "L" is the command "ls mystuff.*." Accordingly, the only item included in history menu 112L represents the command "ls mystuff.*."

To retrieve and re-enter the command "ls mystuff.*," the user selects the only item from history menu 112L as described more completely below. In response to the selection of the item by the user, the command "ls mystuff.*" is retrieved from a history database, which is described in greater detail below, and is processed as if the user had entered the command using conventional techniques.

FIG. 1C shows history menu 112K which is displayed in response to user actuation of history button 108M. History menu 112M includes items 112MA, 112MB, and 112MC, which correspond to respective previously entered commands which include components whose initial letter is "M." Specifically, items 112MA, 112MB, and 112MC correspond to the commands "cd mydir," "ls mystuff.*," and "print mystuff.*," respectively. Each item is formed by prefixing the corresponding command with the component of the command whose initial letter is "M." For example, item 112MA, which corresponds to the command "cd mydir," is represented by the text "mydir: cd mydir." The items are then sorted alphabetically in one embodiment. In alternative embodiments, item 112MA is formed by underlining or otherwise highlighting the component "mydir" in the command "cd mdir" and the items of a history menu are listed in reverse chronological order rather than alphabetic order. It should be noted that, while none of the commands represented by respective items of history menu 112L begin with the letter "M," each of those commands includes a component which begins with the letter "M" and therefore may associated, within the mind of the user, with the letter "M." Under conventional history systems, the commands represented by respective items of history menu 112L would not be accessible by reference to the letter "M" but at best by reference to the initial letter of the entire command.

Figure 2:
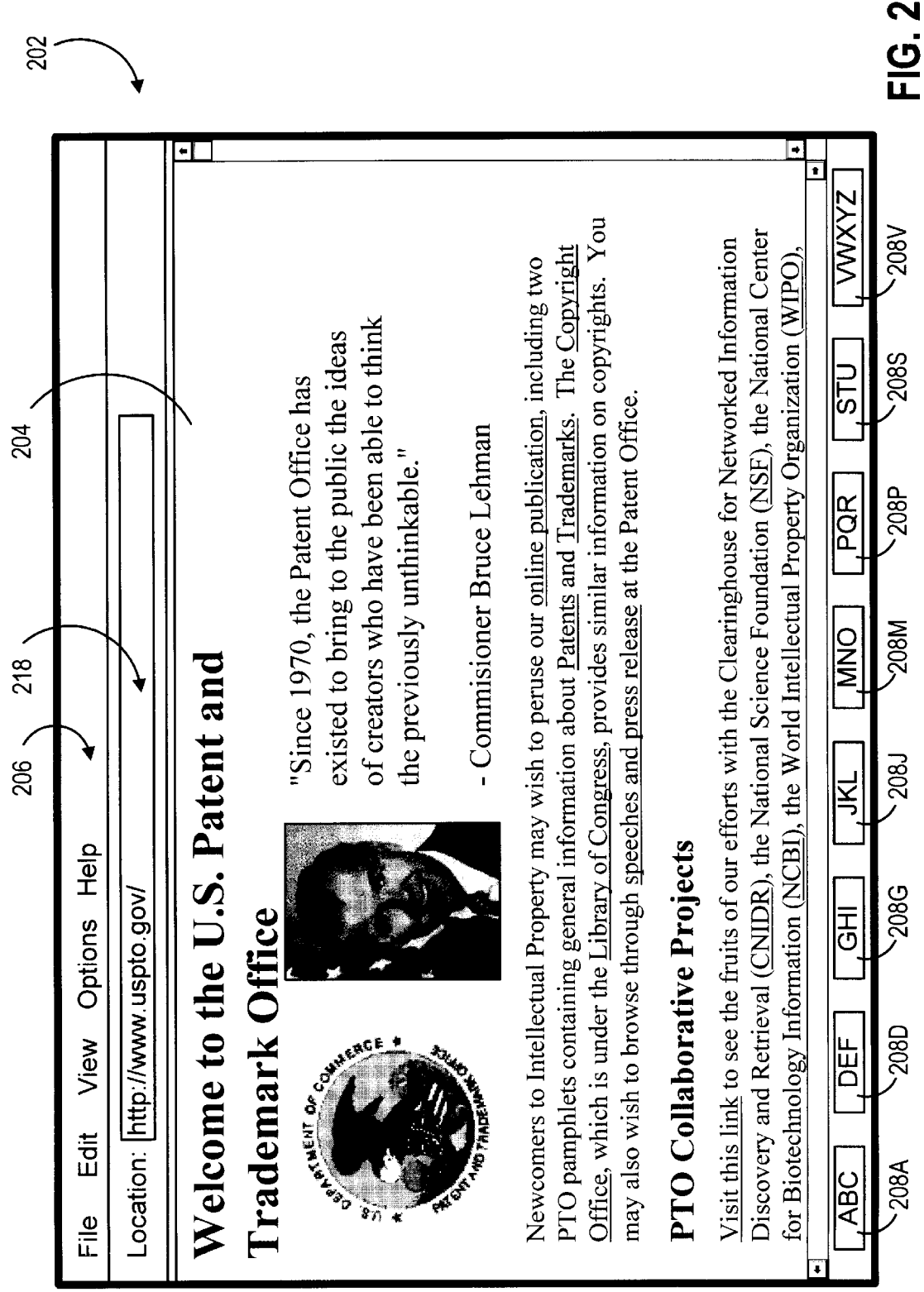
FIG. 2 is a view of a portion of a computer display device of a computer system in which a history mechanism in accordance with the present invention is implemented.

FIG. 2 is a screen view of a Web browser in accordance with the present invention as displayed in a computer display device of a computer system. Window 202 includes a display pane 204, a pull-down menu 206, and history buttons 208A, 208D, 208G, 208J, 208M, 208P, 208S, and 208V. Each of history buttons 208A–V is a virtual button which is generally analogous to history buttons 108 of FIGS. 1A–C. History buttons 208A–V differ from history buttons 108 in that each of history buttons 208A–V is associated with a number of letters of the alphabet rather than with a single respective letter of the alphabet. For example, history button 208A is associated with the letters "A," "B," and "C." Display pane 204 shows a Web document whose title is "United States Patent and Trademark Office." To display the Web document shown in FIG. 2, the user generates user data in the form of a URL which specifies the particular Web document to retrieve and display. In FIG. 2, the URL generated by the user is "http://www.uspto.gov/" as shown in location box 218. Once the Web document shown in display pane 204 is retrieved and displayed, the Web document can later be retrieved and displayed by reference to history buttons 208A–V.

Inclusion of a displayed Web document in the history mechanism of the present invention can be automatic, such that each and every Web document displayed is included in the history mechanism, or by request of the user, i.e., in response to a command issued by the user which directs that the currently displayed Web document be included in the history mechanism. In a manner described more completely below, the title of the Web document is parsed into components and the URL of the currently displayed Web document is associated within the history mechanism of the present invention with each component of the title. For example, the title "United States Patent and Trademark Office" is parsed into the components "United States," "Patent," "Trademark," and "Office." The user can access this Web document by reference in the history mechanism of the present invention to any of these components.

FIGS. 3A and 3B illustrate regeneration of signals specifying retrieval and display of the Web document shown in FIG. 2 by actuation of history button 208S, which is associated with the letters "S," "T," and "U." A cursor 210 is positioned over history button 208S by appropriate manipulation of a pointing device by the user in a conventional manner and the user actuates the pointing device to actuate history button 208S. History button 208S is redisplayed in the computer display device to be shown in a pressed state. Actuation of history button 208S causes display of a history menu 212S, which includes a number of items, including item 212SA. Item 212SA includes text which is a component of the title of the Web document shown in FIG. 2, namely, "United States." In one embodiment of the present invention, it is anticipated that several history elements will be included and categorized under the same title component in the history mechanism of the present invention. Therefore, item 212SA does not represent a single history element but instead represents a collection of history elements associated with a title component "United States." Item 212SA includes specification of the number of history elements associated with the title component "United States" by including the text "(2)" to indicate that two history elements are so associated.

When the user selects item 212SA from history menu 212S, a secondary history menu 214 is displayed in response. Secondary history menu 214 includes an item corresponding to each of the history elements associated with the component "United States." Specifically, secondary history menu 214 includes an item 214A corresponding to the Web document shown in FIG. 2 and an item 214B which also includes the component "United States." Selection of item 214A of secondary history menu 214 by the user in a conventional manner causes retrieval and display of the Web document shown in FIG. 2 in a manner described more completely below. In one embodiment, the user can select all items of secondary history menu 214, e.g., by double-clicking, i.e., actuating twice in quick succession, a pointing device while a cursor is positioned over 212SA. In response to selecting all items of secondary history menu 214, each Web document represented by an item of secondary history menu 214 is displayed in a separate window which is directly analogous to window 202 (FIG. 2).

The user can also cause retrieval and display of the Web document shown in FIG. 2 by reference to the component "Patent" of the title of the Web document by actuation of history button 208P as shown in FIGS. 4A and 4B. Actuation of history button 208P by the user causes display of history menu 212P, which includes item 212PA which in turn specifies the component "Patent." The user selects item 212PA from history menu 212P to cause display of secondary history menu 216, which includes item 216A. However, since secondary history menu 216 includes only a single item, item 216A can be included in history menu 212P in the place of item 212PA in an alternative embodiment. Item 216A includes the title of the Web document shown in FIG. 2 to indicate to the user that selection of item 216A of secondary history menu 216A causes retrieval and display of the Web document shown in FIG. 2. By selecting item 216A, the user causes regeneration of user data requesting retrieval and display of that Web document. Thus, even if the user cannot remember that the title of the Web document shown in FIG. 2 begins with the letter "U," the user can quickly and easily retrieve the Web document by remembering that the title of the Web document includes the component "Patent." In addition, the Web document is included in the history mechanism of the present invention and categorized automatically, saving time and effort by the user in devising a suitable organization and standardizing the organization such that a second user can quickly and easily locate Web documents located previously by the first user.

To this point, only alphabetic categorization of history elements has been described. It is appreciated that other symbols can be used to categorize history elements. For example, numerals and other characters of the standard ASCII character set can be used to categorize history elements corresponding to parse components expressed in terms of alphanumeric characters. It is preferred that the particular categories under which history elements are organized are symbolic components of the history elements and that the organization be a standardized one. For example, with respect to FIGS. 1A–C, letters of the alphabet, in alphabetic order, are used as the categories represented by history buttons 208 since components of c-shell commands frequently begin with letters of the alphabet and the alphabet is a standardized organization of the letters of the alphabet. If numerals are used as categories, it is preferred that the numerals are represented to the user in numerical order, e.g., 0–9 or 1–9 then 0. Symbols or characters which generally have no standardized order can be represented to the user in any order. However, it is preferred that once an order is selected for presentation of symbols to a user, the symbols are thereafter presented to the user in that order with consistency.

Figure 5A:
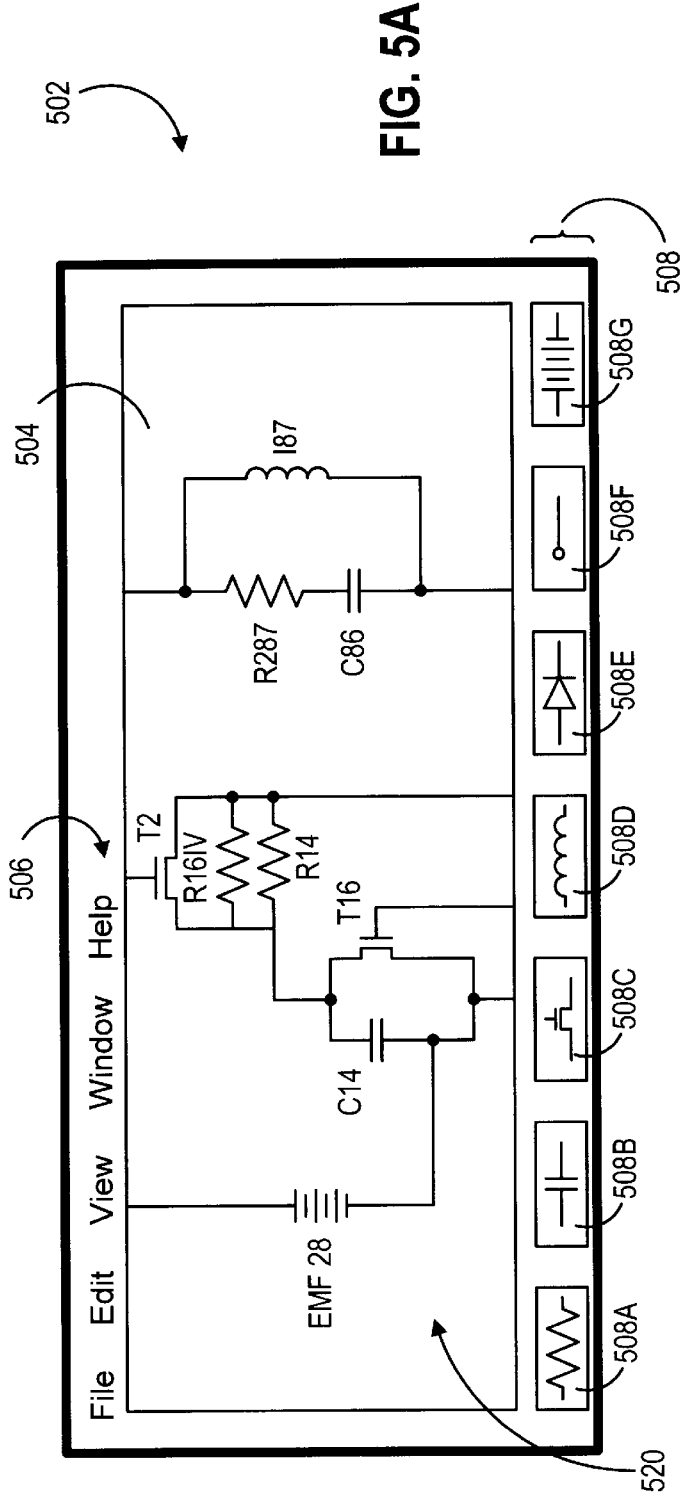
FIGS. 5A-B are views of a portion of a computer display device of a computer system in which a history mechanism in accordance with the present invention is implemented.
Figure 5B:
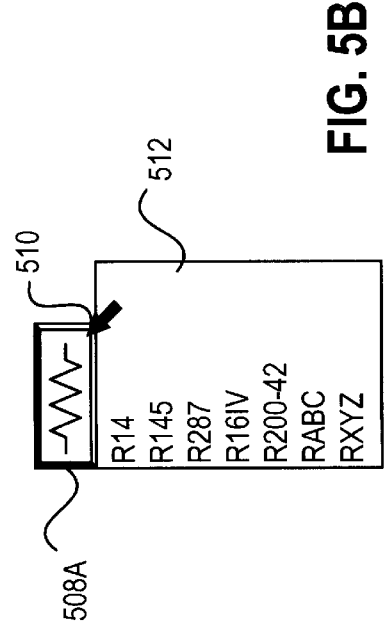

FIGS. 5A and 5B illustrate a history mechanism in accordance with the present invention in which history elements are not categorized by letters of the alphabet or by any characters of the standard ASCII set but are instead categorized by graphical symbols representing types of electrical component, each type being representable by a standard and known respective symbol. Window 502 is displayed by a circuit editor, which is a computer process by which a user creates and/or edits a circuit design as represented on the display device of a computer system. In the course of creating and editing a circuit design 520, the user generates user data which specify a particular electrical component of circuit design 520. In response to the user data, the circuit editor identifies the electrical component as selected and can redisplay circuit design 520 if necessary such that the selected electrical component is visible in display pane 504. Window 502 also includes a pull-down menu 506 by which the user generates user data which directs the circuit editor to take action in accordance with such user data in a conventional manner.

Window 502 further includes history buttons 508. Each of history buttons 508 is a virtual button which is generally analogous to any of history buttons 108 (FIG. 1A) or history buttons 208A–V (FIG. 2) and is associated with a type of electrical component and includes in the representation of the history button a schematic symbol for the type of associated electrical component. For example, history button 508A is associated with resistors and includes in the representation of history button 508A a schematic symbol for a resistor. While the schematic symbol for a resistor may not be stored within the circuit editor within a data structure representing a particular resistor, such a data structure typically identifies a resistor as such. The schematic symbol for a resistor is therefore, perhaps indirectly, a component of the data structure representing the resistor. The schematic symbol is a prominent symbol of a particular resistor in relation to other components which identify the resistor.

History buttons 508B-G are associated with capacitors, transistors, inductors, diodes, terminals, and EMF sources, respectively. Of course, electrical components can be categorized in other ways and the categorization shown in FIG. 5A is merely illustrative. To regenerate previously generated user data to thereby identify a previously identified resistor of circuit design 520, the user actuates history button 508A using a cursor 510 (FIG. 5B). In response, a history menu 512 is displayed. History menu 512 includes zero or more items, each of which corresponds to a respective resistor of circuit design 520 and each of which is represented to the user as an identifier of the particular respective resistor. The user identifies a previously identified resistor by selecting the corresponding item from history menu 512 in the manner described above with respect to FIGS. 1A–C, 2, 3A-B and 4A-B.

Structural Components

Figure 6:
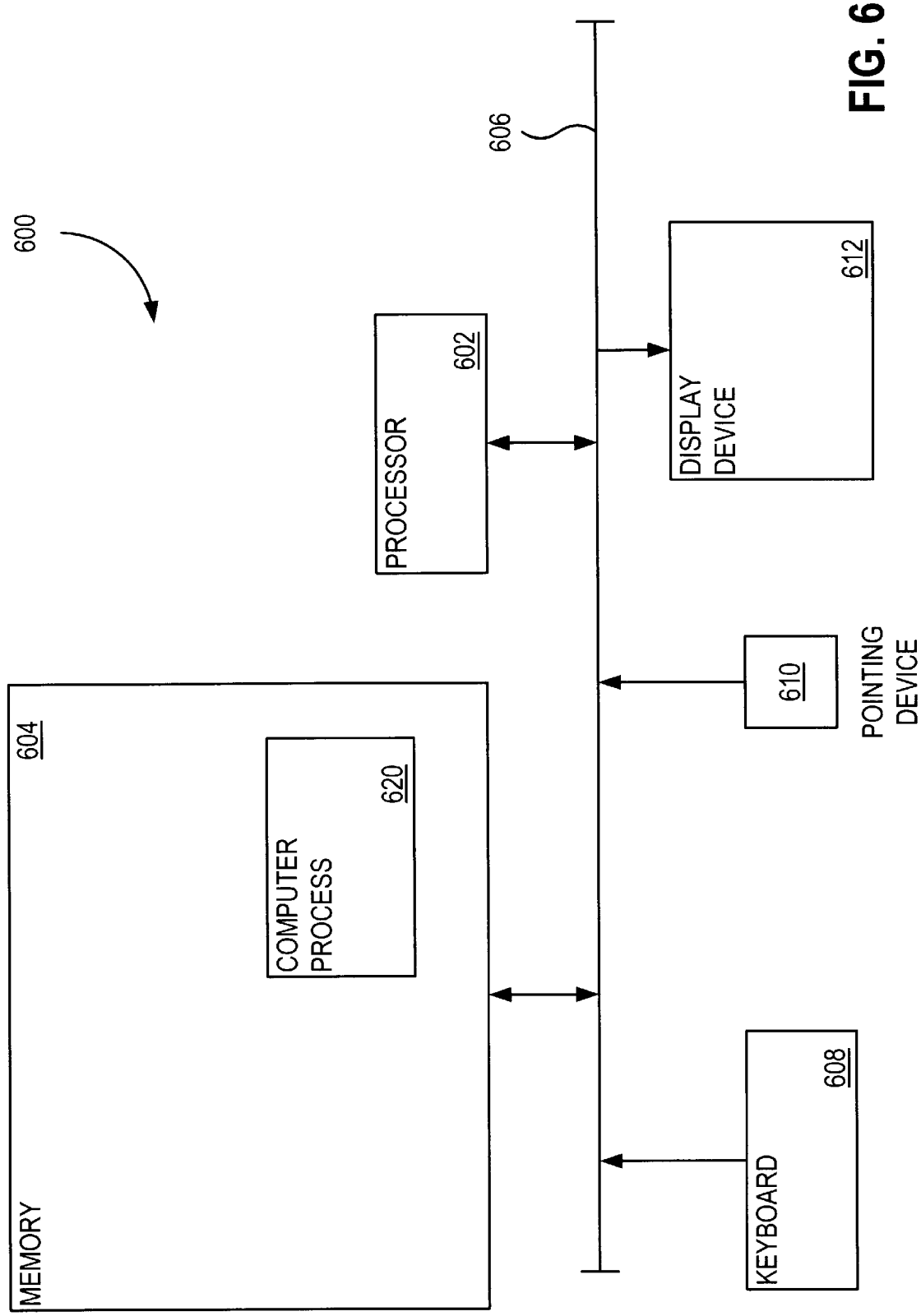
FIG. 6 is a block diagram of a computer system in accordance with the present invention.

The structural components and database structures which support the novel user-interface described above are now described. Many different computer system architectures are in use today, but most of these computer system architectures are generally analogous to computer system 600 (FIG. 6). Computer system 600 includes a processor 602 which fetches computer instructions from a memory 604 through a bus 606 and processes those 30 instructions to perform tasks specified in terms of those instructions. Such tasks include retrieving data from memory 604, writing data to memory 604, retrieving user-generated signals through bus 606 from a keyboard 608 and/or a pointing device 610, and writing data through bus 606 to a display device 612 for display of the data to the user. Processor 602 can be, for example, the SPARC processor available from Sun Microsystems, Inc. of Mountain View, Calif. Memory 604 can include any type of memory including, without limitation, randomly accessible memory (RAM), read-only memory (ROM), and secondary storage media such as magnetic and optical disks. Pointing device 610 can be any pointing device, sometimes referred to as a locator, by which a user specifies a point in space, e.g., a two-dimensional space. Such a pointing device can be, without limitation, an electronic mouse, a trackball, a lightpen, a touch-sensitive screen, a tablet, a digitizing table, or thumbwheels.

Pressing a key on keyboard 608 generates signals which identify the pressed key and which are transmitted from keyboard 608 through bus 606 to processor 602. By pressing various keys of keyboard 608 in sequence, the user can generate signals which are combined by processor 602 to form textual user data such as a c-shell command. The user can generate signals by physical manipulation of pointing device 610 as well. In one embodiment, pointing device 610 is an electronic mouse and movement of pointing device 610 over a work surface such as a desktop generates signals which are transmitted through bus 606 to processor 602. Processor 602 uses such signals to control the position of a cursor, e.g., cursor 110 (FIG. 1B), in display device 612 (FIG. 6). Pointing device 610 also has one or more physical buttons, actuation of which generate and transmit to processor 602 button actuation signals. The particular action taken by processor 602 and computer process 620 in response to such button actuation signals depends in part on the particular position of the cursor in display device 612. For example, if the cursor is positioned over a virtual button displayed in display device 612 when such button actuation signals are received by processor 602, the virtual button is actuated and computer process 620 takes appropriate action in accordance with the particular computer instructions of computer process 620. If the cursor is positioned over a particular item of a particular menu when such button actuation signals are received by processor 602, that item is selected and the menu is closed and computer process 620 takes appropriate action in accordance with the particular computer instructions of computer process 620. The physical movement and manipulation of user input devices such as keyboard 608 and pointing device 610 by the user is generally referred to as a gesture.

Figure 7:
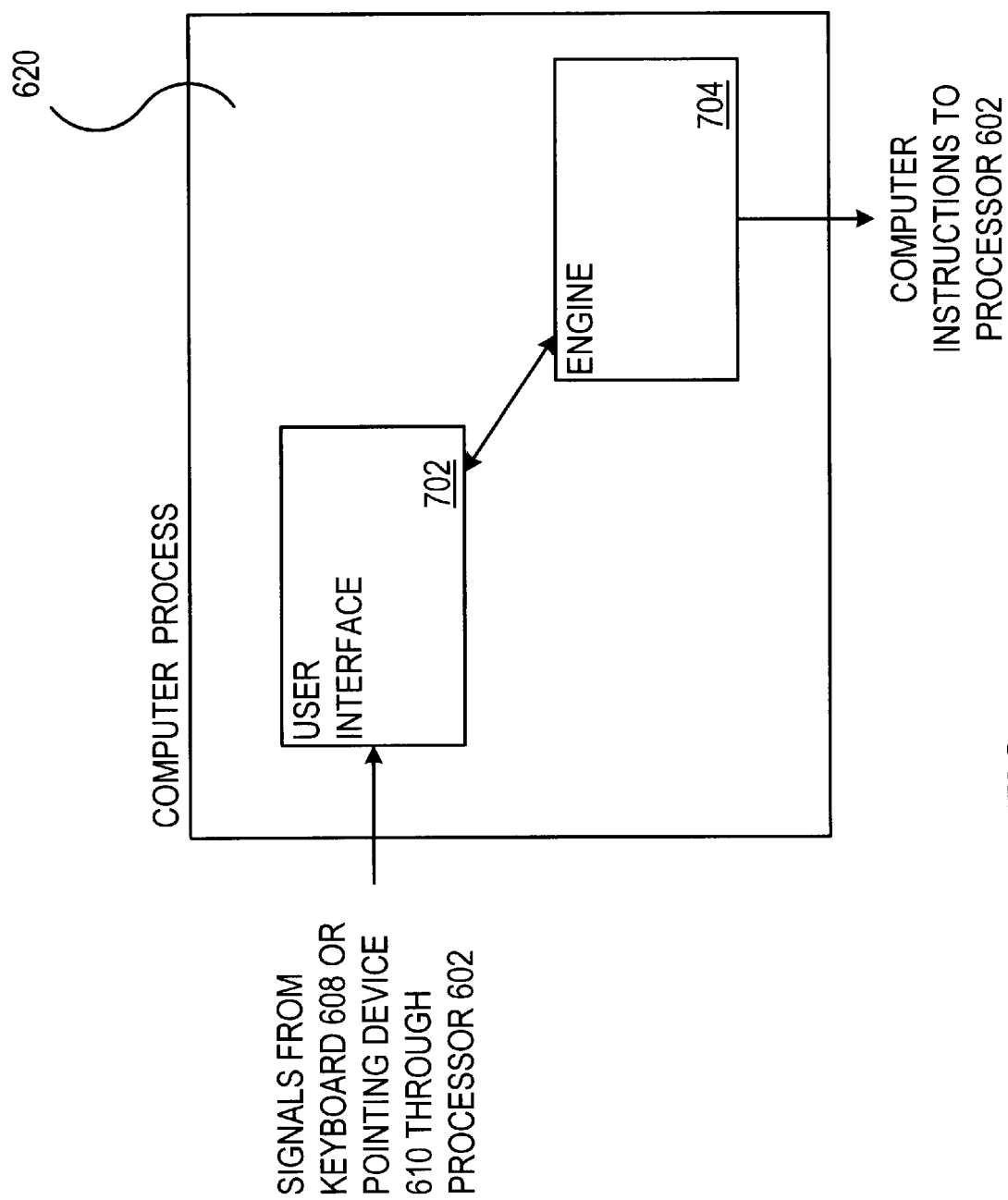
FIG. 7 is a block diagram of a computer process shown in FIG. 6.

A computer process 620 executes within processor 602 from memory 604 and is shown in greater detail in FIG. 7. Computer process 620 includes a user-interface 702 and an engine 704. Engine 704 can generally be any type of engine and acts in accordance with user data received from user-interface 702. For example, in the embodiment of FIGS. 1A–C, engine 704 is a c-shell command interpreter. In the embodiment of FIGS. 2, 3A-B, and 4A-B, engine 704 is a World Wide Web browser. In the embodiment of FIGS. 5A-B, engine 704 is a circuit editor.

User-interface 702 provides various mechanisms to the user by which the user can generate user data for transmission to engine 704. For example, user-interface 702 displays a text-interface in pane 104 of window 102 and enables the user to generate signals by physically pressing appropriate keys on keyboard 608 and the signals are converted to user data in the form of c-shell commands and transmitted to engine 704 by user-interface 702. In addition, user-interface 702 displays pull-down menu 106 and allows the user to generate user data in the form of c-shell commands by selecting various menu items from pull-down menu 106 by appropriate manipulation of pointing device 610.

Figure 8:
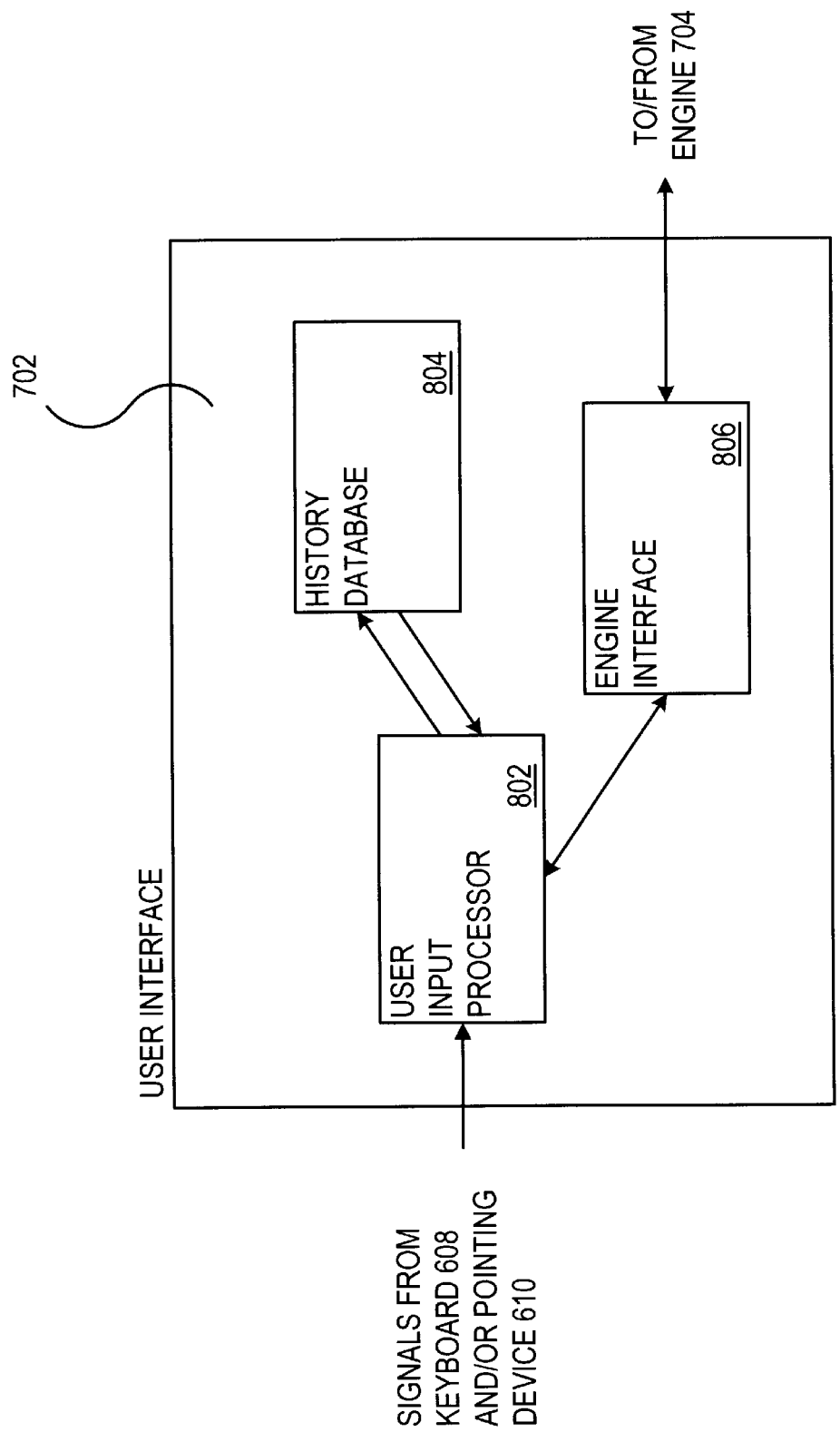
FIG. 8 is a block diagram of a user-interface portion of the computer process of FIG. 7.

User-interface 702 is shown more completely in FIG. 8. User-interface 702 includes a user input processor 802 which processes signals generated by the user by appropriate manipulation of keyboard 608 (FIG. 6) and pointing device 610. User input processor 802 (FIG. 8) determines, in a manner described more completely below, whether signals generated by the user refer to previously generated user data. For example, user input processor 802 determines whether signals generated by the user of window 102 (FIG. 1A) (i) represent a c-shell command which should be forwarded to engine 704 (FIG. 8) through an engine interface 806 or (ii) refer to a previously generated c-shell command accessible through history buttons 108 (FIG. 1A) in the manner described above. If the signals refer to previously generated user data, user input processor 802 (FIG. 8) retrieves the previously generated signals from a history database 804, which is described more completely below. Otherwise, user input processor 802 stores the most recently generated user data in history database 804 if all user data are automatically stored in history database 804 or if the user requests that the user data be stored in history database 804.

History Database

Figure 9:
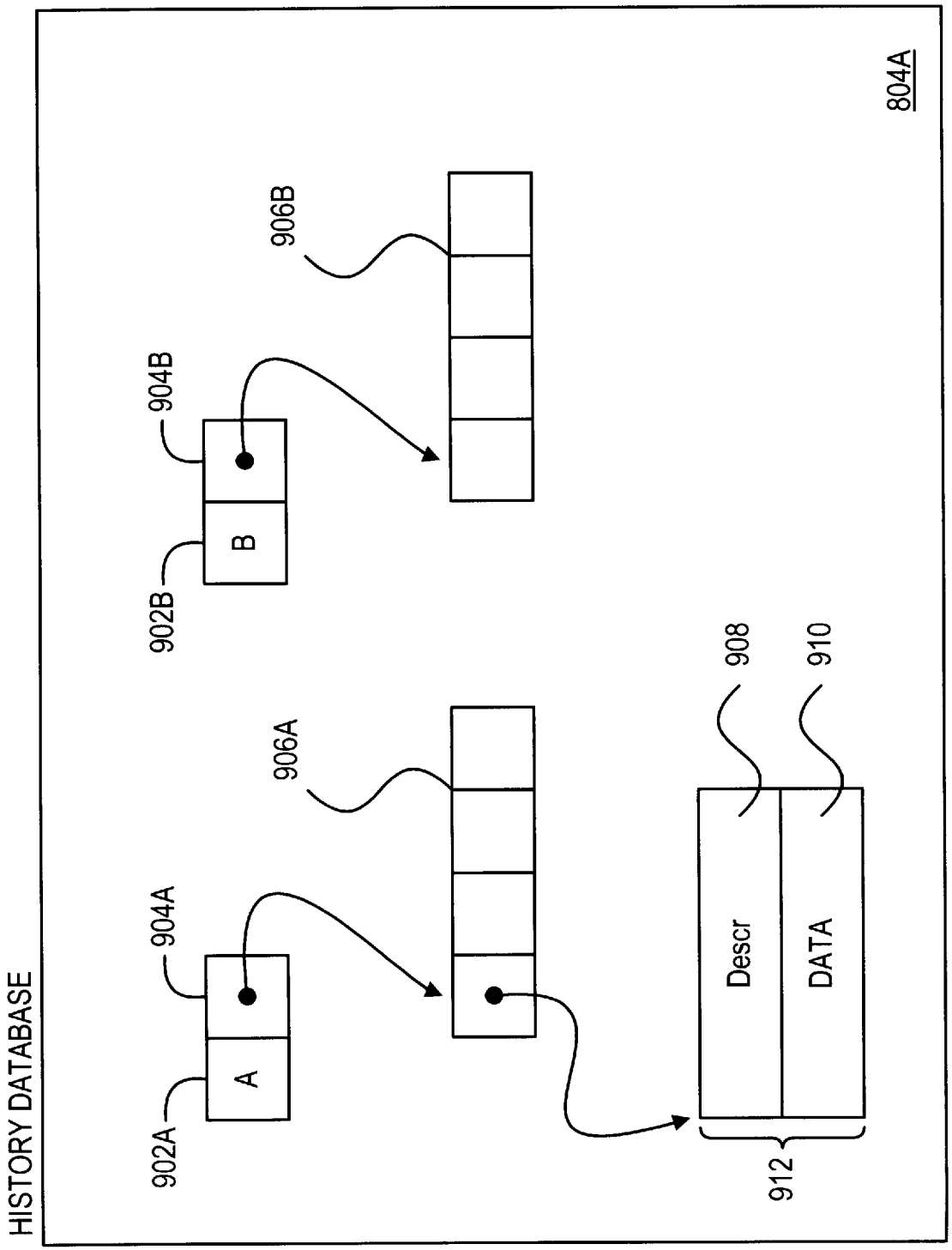
FIGS. 9 and 10 are block diagrams of respective embodiment of a history database in accordance with the present invention.

In general, history database 804 is a data structure in which history elements representing previously generated user data are stored and from which previously generated user data are retrieved. The particular structure of history database 804 depends on the nature of the user data to be stored in history database 804 and the particular user-interface by which history elements are retrieved from history database 804. FIG. 9 illustrates the structure of history database 804A, which is an illustrative example of history database 804 and which is generally suitable for use in conjunction with history buttons 108 (FIGS. 1A–C). History database 804A includes head links 902A–Z (only head links 902A and 902B are shown) which correspond to letters "A" through "Z," respectively. Each of head links 902B–Z is directly analogous to head link 902A, whose following description is equally applicable to each of head links 902B–Z.

Head link 902A includes a pointer 904A to a list 906A of history elements, each of which includes description and data fields. For example, the first history element of list 906A is history element 912, which includes a description field 908 and a data field 910. Description field 908 includes data which represent in memory 604 a description of the previously generated user data represented by history element 912. The description represented by the data of description field 908 is the description which is displayed to the user to represent the previously generated user data and by which the user identifies the previously generated user data. Data field 910 includes data which represent in memory 604 the previously generated signals. For example, in the context of the text-based implementation shown in and described in conjunction with FIGS. 1A–C, if the previously generated user data represent the c-shel command "ls -Fl allmystuff.*," description field 908 includes data representing in memory 604 the description "all-mystuff.*: ls -Fl allmystuff.*" and data field 910 includes user data representing the c-shell command "ls -Fl all-mystuff.*." It is generally preferred that, within the descrip-tion of the user data, as presented to the user by display in computer display device 612, somehow distinguish the component according to which history element 912 is categorized within history database 804A from the remainder of the description of the user data. Rather than prefix the description with the component as described above, the component is highlighted, e.g., represented in italics or bolded text, in an alternative embodiment. Furthermore, it is not necessary to store the description in description field 908 in the particular form that is shown to the user in history menu 112M. Instead, the description can be stored in description field 908 in an unaltered form and an indication of which component of the description is to be highlighted can be stored separately in history element 912. Such an indication can be, for example, an integer specifying the sequential position of the component within the description stored in description field 908. It is further appreciated that in some embodiments, such as that presently described, data field 910 is unnecessary since the previously generated user data represented by history element 912 can be derived from the description represented in description field 908.

Figure 10:
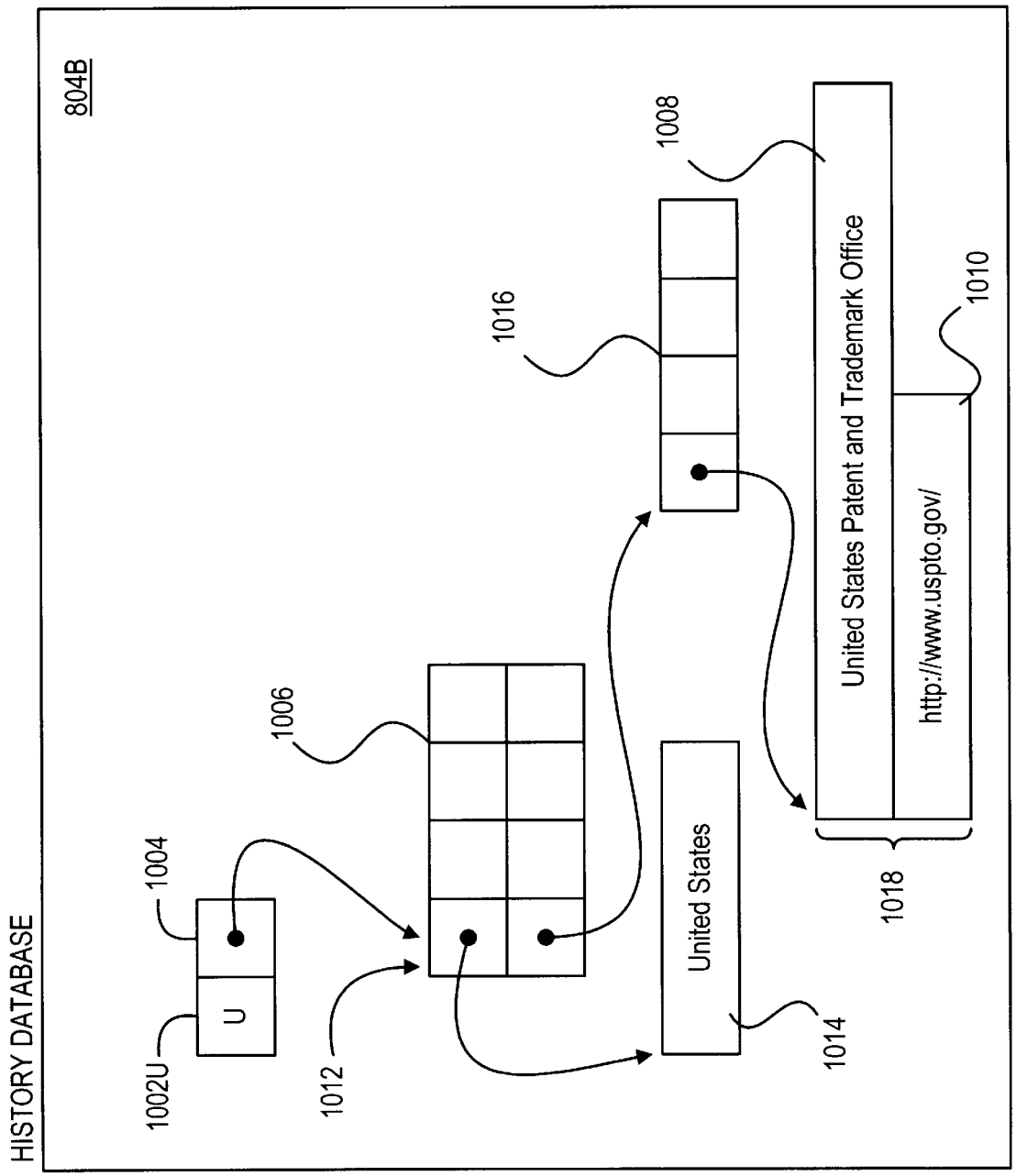

FIG. 10 illustrates the structure of history database 804B, which is a second illustrative example of history database 804 and which is suitable for use in conjunction with history buttons 208A–V (FIGS. 2, 3A-B, and 4A-B). History database 804B includes head links 1002A–Z (only head link 1002U is shown) which correspond to letters "A" through "Z," respectively. Each of head links 1002A–T and 1002V–Z is directly analogous to head link 1002U, whose following description is equally applicable to each of head links 1002A–T and 1002V–Z. Head link 1002U is described in the context of the illustrative example of FIGS. 3A-B in which the previously generated user data specify a Web document whose description is "United States Patent and Trademark Office" and is categorized under the component "United States" and whose URL is "http://www.uspto.gov/".

Head link 1002U includes a pointer 1004 to a list 1006 of secondary head links, e.g., secondary head link 1012, each of which represents a secondary history menu such as secondary history menu 214 (FIG. 3B). Head link 1012 includes a pointer to an item description field 1014 and to an associated list 1016 of history elements. Item description field 1014 includes data which specify the textual description of item 212SA (FIG. 3A) of history menu 212S. Specifically, item description field 1014 (FIG. 10) includes data specifying the textual description "United States" which, as described above, is the component of the title under which the subject Web document is categorized. List 1016 of history elements is directly analogous to list 906A (FIG. 9) and is described here briefly for completeness.

The first history element, e.g., history element 1018, of list 1016 is accurately representative of all history elements of list 1016. History element 1018 includes a description field 1008 and a data field 1010. Description field 1008 includes data which represent in memory 604 a description of the previously generated user data represented by history element 1018. In the example of FIGS. 3A-B, description field 1008 includes data representing the text "United States Patent and Trademark Office." Data field 1010 includes data which represent in memory 604 the previously generated user data. Continuing in the example of FIGS. 3A-B, data field 1010 includes data representing the URL "http ://www.uspto.gov/".

Thus, description field 1008 includes data by which previously generated user data are represented to the user and associated data field 1010 stores the previously generated user data for subsequent use. List 1006 of secondary head links provides the second organizational level of user data categorization represented by secondary history menu 212S (FIGS. 3A-B) and secondary history menu 212P (FIGS. 4A-B). The user-interface by which specific previously generated user data are retrieved from history database 804B (FIG. 10) in response to signals generated by the user is defined and implemented by user input processor 802 (FIG. 8) of user-interface 702.

Implementation of the History User Interface

Figure 11:
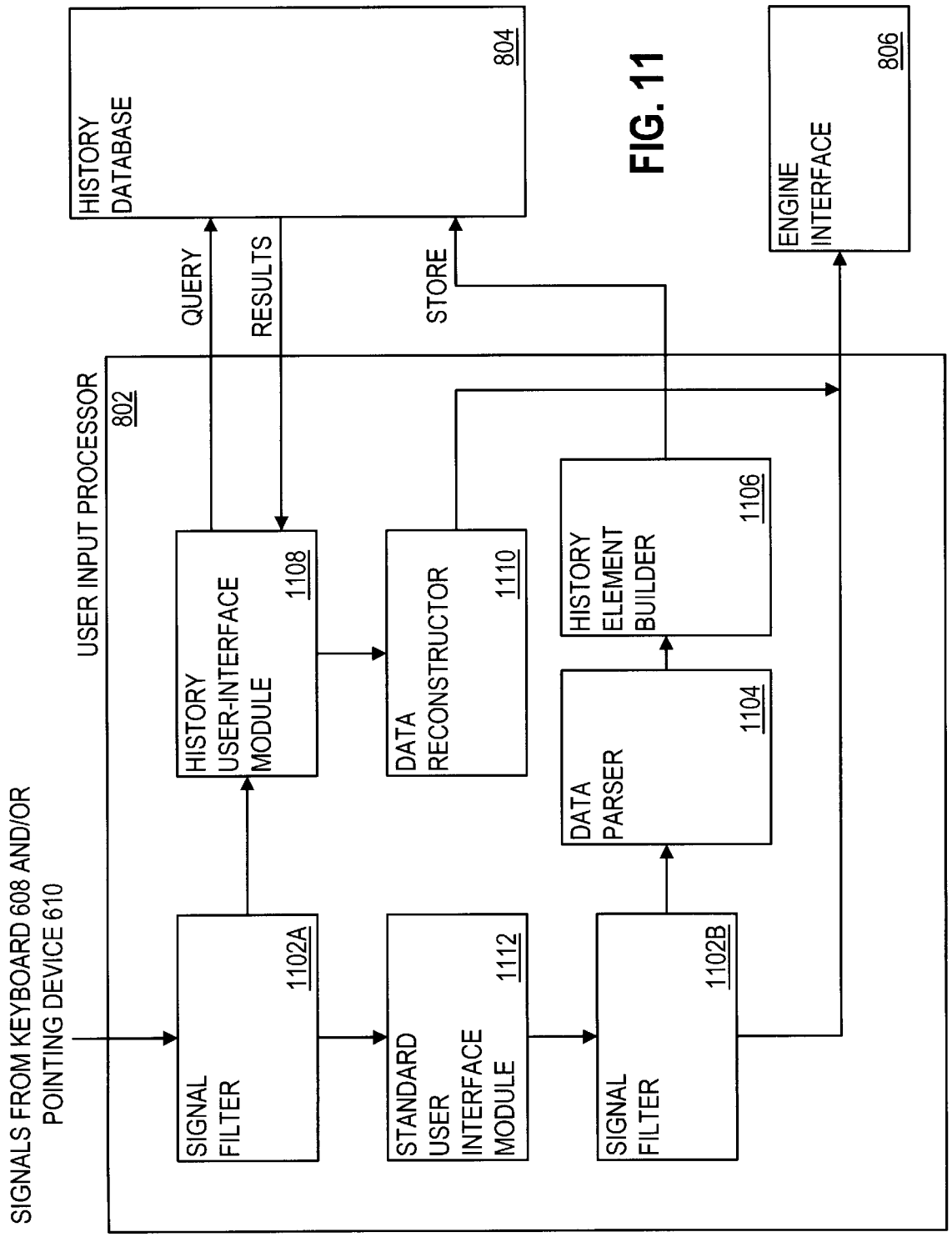
FIG. 11 is a block diagram of a user-interface processor of the user-interface portion of FIG. 8.

User input processor 802 (FIG. 8) is shown more completely in FIG. 11. User input processor 802 includes a signal filters 1102A and 1102B which include logic which receives, as input, signals generated by the user, for example, by physical manipulation of keyboard 608 (FIG. 6) or pointing device 610. Specifically, the physical manipulation can include movement of pointing device 610 or pressing keys on keyboard 608 as described above. Signal filters 1102A and 1102B each includes logic and makes one of two determinations with respect to the received signals. First, logic in signal filter 1102A determines whether the received signals refer to previously generated user data stored in history database 804. For example, the received signals refer to previously generated user data if the received signals indicate that the user has actuated a history button such as any of history buttons 108 (FIGS. 1A–C). Second, if logic in signal filter 1102A determines that the received signals do not refer to previously generated user data stored in history database 804, logic in signal filter 1102B determines whether to store in history database 804 user data represented by the received signals.

If signal filter 1102A determines that the received signals refer to previously generated user data which are stored in history database 804, e.g., by detecting that one of history buttons 108 is actuated by the user, signal filter 1102A causes a history user-interface module 1108 to select, in accordance with further signals generated by the user, previously generated user data from history database 804. Signal filter 1102A, in one embodiment, transmits data specifying which of history buttons 108 is actuated by the user to history user-interface 1108 to cause history user interface module 1108 to select the previously generated user data. By specifying which of history buttons 108 is actuated by the user, history user-interface module 1108 is able to display the history menu which corresponds to the actuate history button.

Figure 12:
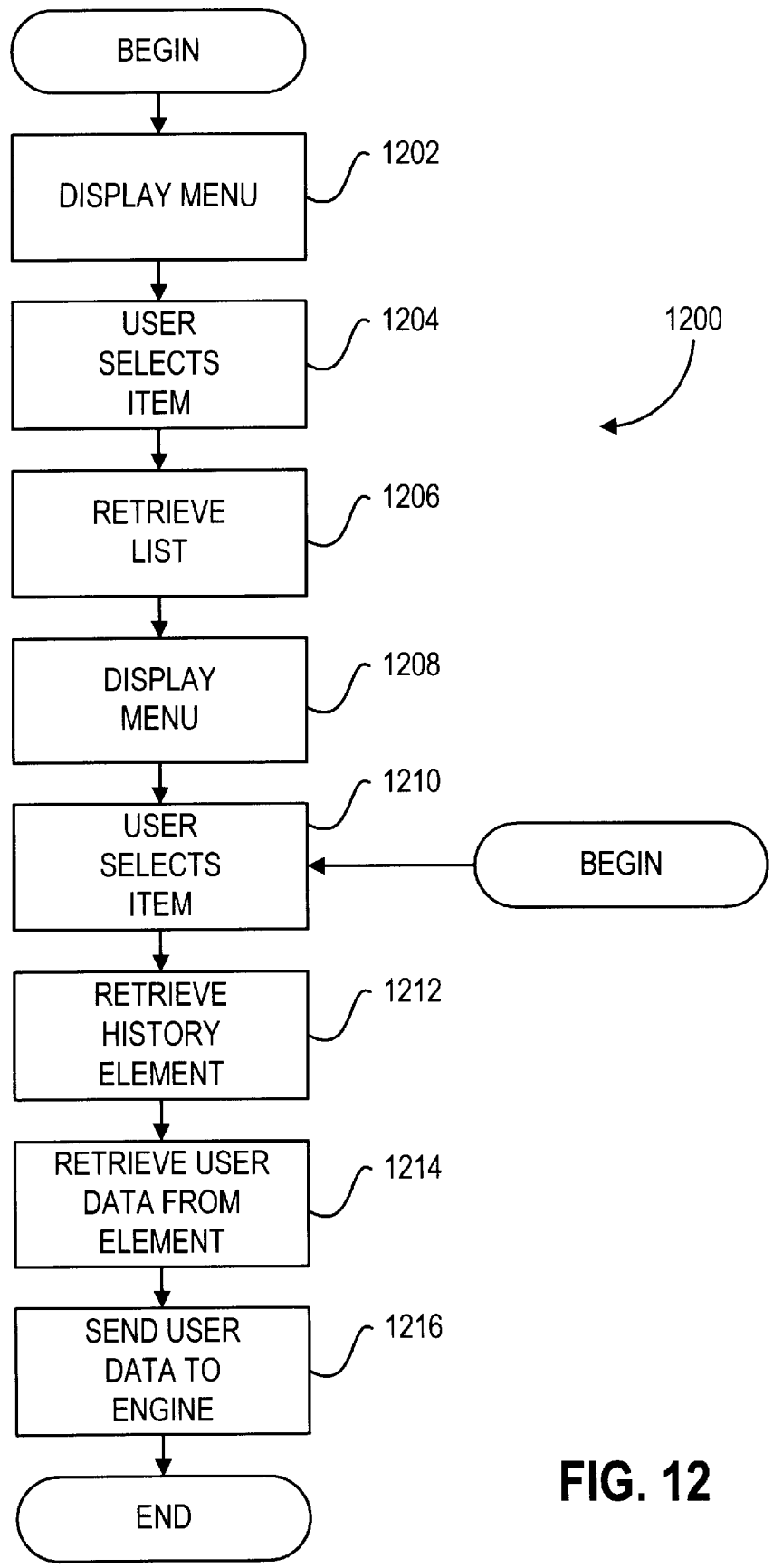
FIG. 12 is a logic flow diagram illustrating inclusion of user data in a history database in accordance with the present invention.

In response to the data received from signal filter 1102A, history user-interface module 1108 implements a user-interface by which the user specifies a particular one of the history elements stored in history database 804. One such user-interface is illustrated as logic flow diagram 1200 (FIG. 12). Processing by history user-interface module 1108 (FIG. 11) according to logic flow diagram 1200 FIG. 12) is described in the context of the illustrative example of FIGS. 3A-B and 10. In this example, signal filter 1102 FIG. 11) has determined that the user has actuated history button 208S (FIG. 3A) and is therefore referencing a previously generated signal, which is in the context of FIGS. 3A-B, a URL. Signal filter 1102 (FIG. 11) transmits to history user-interface data specifying that the user has actuated history button 208S.

Processing by history user-interface module 1108 begins in step 1202 (FIG. 12) in which history user-interface module 1108 displays the history menu corresponding to the actuated history button, e.g., history menu 212S (FIG. 3A) which corresponds to history button 208S. History user-interface module 1108 (FIG. 11) creates history menu 212S from records stored in history database 804B (FIG. 10).

Since history button 208S (FIG. 3A) corresponds to letters "S," "T," and "U" of the alphabet, history user-interface module 1108 (FIG. 11) queries history database 804B (FIG. 10) for all items stored under head links 1002S, 1002T, and 1002U (only head link 1002U is shown in FIG. 10). In response, history database 804B provides to history user-interface module 1108 list 1006 of secondary head links and corresponding lists of secondary head links referenced by head links 1002S and 1002T. As described above, each secondary head link of list 1006 and corresponding lists referenced by head links 1002S and 1002T includes an item description field, e.g., item description field 1014, which provides a textual description of a particular item of history menu 212S (FIG. 3A). From the item description fields of the various secondary head links of the lists provided by history database 804B (FIG. 10), history user-interface module 1108 (FIG. 11) creates and displays history menu 212S (FIG. 3A).

In this example, the user selects item 212SA from history menu 212 and this selection is recognized by history user-interface module 1108 (FIG. 11) in step 1204 (FIG. 12) to which processing transfers from step 1202. From step 1204, processing transfers to step 1206 in which history user-interface module 1108 (FIG. 11) retrieves from history database 804B (FIG. 10) list 1016 of history elements which is associated with item description field 1014 which in turn corresponds to item 212SA (FIG. 3A) which is selected from history menu 212S by the user. In the examples of FIGS. 1A–C, 5, and 9, in which no secondary history menus are produced, processing begins at step 1206 (FIG. 12).

From step 1206, processing transfers to step 1208 in which history user-interface module 1108 (FIG. 11) creates secondary history menu 214 (FIG. 3B) from list 1016 (FIG. 10) by including as items in secondary history menu 214 (FIG. 3B) the description field of each history element in list 1016 (FIG. 10) and displays secondary history menu 214 (FIG. 3B). For example, item 214A is retrieved from description field 1008 (FIG. 10) of history element 1018. As described above, description field 1008 includes data representing the title of a particular Web document. Thus, the items of secondary history menu 214 (FIG. 3B) are titles of respective Web documents in this example and those titles are retrieved from history database 804B (FIG. 10).

Once secondary history menu 214 (FIG. 3B) is created and displayed by history user-interface module 1108 (FIG. 11) in step 1208 (FIG. 12), processing transfers to step 1210 in which, in this example, the user selects item 214A (FIG. 3B) from secondary history menu 214 and history user-interface module 1108 (FIG. 11) recognizes this selection. Processing transfers from step 1210 (FIG. 12) to step 1212 in which history user-interface module 1108 (FIG. 11) retrieves from list 1016 (FIG. 10) history element 1018 which corresponds to item 214A (FIG. 3B) which is selected by secondary history menu 214 by the user as described above. In step 1214 (FIG. 12), to which processing transfers from step 1212, history user-interface module 1108 (FIG. 11) retrieves data field 1010 (FIG. 10) from history element 1018. As described above more completely, data field 1010 of history element 1018 includes previously generated user data stored in memory 604 (FIG. 6).

Data field 1010 FIG. 10) is then transmitted from history user-interface module 1108 (FIG. 11) to a data reconstructor 1110, which reconstructs from data field 1010 (FIG. 10) the previously generated signals represented by history element 1018 in step 1214 (FIG. 12). Data reconstructor 1110 (FIG. 11) retrieves data from data field 1010 (FIG. 10) and translates the retrieved data into the form of user data accepted by engine 704 (FIG. 7) through engine interface 806 (FIG. 8). In this example, the data retrieved from data field 1010 (FIG. 10) are alphanumeric characters which collectively specify a LURL of a Web document. Data reconstructor 1110 (FIG. 11) produces a URL in the form produced by user-interface processor 802 (FIG. 8) when the user specifies a link contained within a Web document.

Processing transfers from step 1214 (FIG. 12) to step 1216 in which the reconstructed user data are transmitted to engine interface 806 (FIG. 8). Since engine interface 806 cannot distinguish the reconstructed user data from user data generated more directly by the user, i.e., without reference to previously generated user data, engine interface 806 processes reconstructed user data as if the user data had been generated by the user directly rather than retrieved from history database 804B. Thus, according to logic flow diagram 1200 (FIG. 12), history user-interface module 1108 (FIG. 11) and data reconstructor 1110 allow the user to retrieve and regenerate previously generated user data in accordance with a simple and intuitive menu user-interface.

If signals logic 1102A determines that signals generated by the user do not refer to previously generated user data stored in history database 804, e.g., that the signals generated by the user indicate some action other than actuation of a history button, processing of the received signals transfers not to history user-interface module 1108 but instead to standard user-interface module 1112. Standard user-interface module 1112 provides a generally conventional user-interface whereby the user can manipulate the displayed information using conventional techniques. For example, in the context of FIGS. 1A–C in which the displayed information is a c-shell command, standard user-interface module 1112 allows the user to enter c-shell commands by pressing keys on keyboard 608. In the context of FIGS. 2, 3A-B, and 4A-B, in which the displayed information is a Web document retrieved from the World Wide Web, standard user-interface module 1112 allows the user to (i) scroll the Web document to show portions of the Web document which are not visible in display pane 204 or to (ii) specify another Web document for retrieval and display using conventional techniques, e.g., by using keyboard 608 (FIG. 6) to enter a URL or by selecting a link in a displayed Web document to thereby specify the URL.

Figure 13:
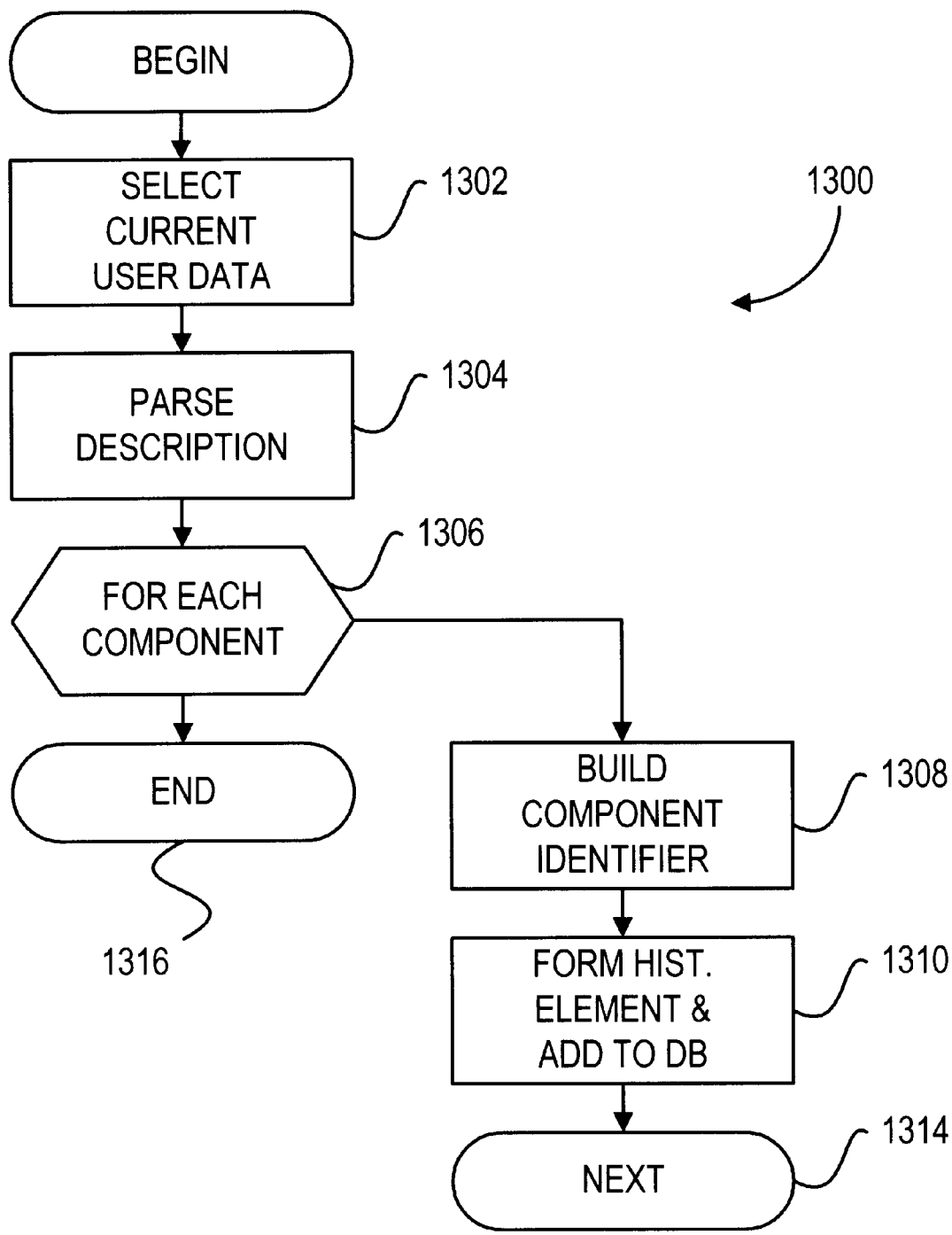
FIG. 13 is a logic flow diagram of retrieval of user data from a history database in response to user-generated signals in accordance with the present invention.

After processing by standard user-interface module 1112 (FIG. 12), signal filter 1102B receives from standard user-interface module 1112 user data representing the user generated signals and determines whether to store the user data in history database 804. In one embodiment, all user data received by signal filter 1102B are stored in history database 804. For example, every c-shell command or every World Wide Web URL entered by the user or every electrical component selected by the user is stored in history database 804. In an alternative embodiment, only user data which are so designated by the user are stored in history database 804. For example, in a Web browser implementation of the present invention, e.g., the embodiment of FIGS. 2, 3A-B, and 4A-B, the user issues a save instruction which causes the URL of the currently displayed Web document to be stored in history database 804. In either case, if the user data are not to be stored in history database 804, signal filter 1102B transmits the user data to engine interface 806 for processing as described more completely above. Conversely, if the user data are to be stored in history database 804, signal filter 1102B transmits the user data to a data parser 1104 in step 1302 (FIG. 13) of logic flow diagram 1300. In the embodiment in which all user data are stored in history database 804, signal filter 1102B transmits the user data to both data parser 1104 and engine interface 806 for processing. Logic flow diagram 1300 illustrates the inclusion of a history element in history database 804 (FIG. 11).

In step 1302 (FIG. 13), signal filter 1102B (FIG. 11) also transmits to data parser 1104 any other data which is necessary for the formation of a history element. In the context of FIGS. 1A–C, the user data is a c-shell command and is itself sufficient to form a history element since the description of the user-generated data is derived from the user-generated data itself In the context of FIGS. 2, 3A-B, and 4A-B, signal filter 1102B transmits, in addition to the URL which is the user-generated data, the title of the Web document identified by the URL since the description of the user data is the title which is therefore necessary for the construction of a history element. Signal filter 1102B retrieves the title from the Web document identified by the user data. In an alternative embodiment, signal filter 1102B transmits only user data in the form of the URL of a Web document and the title of the Web document is retrieved from the Web document by data parser 1104 or, in another alternative embodiment, by a history element builder 1106 which is described below.

Data parser 1104 parses the description of the received user data into components of the description in step 1304, to which processing transfers after step 1302. In the context of FIGS. 1A–C, the user data are self-describing, represent c-shell commands, and are therefore parsed into the c-shell command itself, switches, and parameters according to the c-shell command language. For example, the c-shell command "ls -Fl allmystuff.*" is parsed into the c-shell command "ls," the switch "-Fl," and the parameter "allmystuff.*." In the context of FIGS. 2, 3A-B, and 4A-B, the user URL are described by the title of the Web document in the World Wide Web and the title is parsed into individual terms of the title. For example, the title "United States Patent and Trademark Office" is parsed into "United," "States," "Patent," "and," "Trademark," and "Office." It is preferred that certain frequently occurring or less significant components be removed from the parsed components to avoid less useful, redundant inclusion of user data in history database 804. For example, it is anticipated that an inordinate number of Web documents will include the word "and" in the title and the word "and" itself provides little, if any, information regarding the nature of a Web document which includes "and" in the title. Accordingly, the word "and" is not parsed as a component of the title. Similarly, switches used in c-shell commands, e.g., "-Fl" in "ls -Fl allmystuff.*," provide little information regarding the nature of a c-shell command and are therefore not parsed as components of a c-shell command from the perspective of data parser 1104.

In one embodiment, specific terms which are excluded as components by data parser 1104 are maintained in a list or other data structure in memory 604 (FIG. 604) which is accessible by data parser 1104 (FIG. 11). It is preferred that the user be provided with mechanisms for altering the contents of such a data structure to thereby tailor the parsing of data by data parser 1104 according to the specific needs of the user. It is also preferred that any such data structure be initialized to exclude a number of commonly used components. For example, in the context of FIGS. 2, 3A-B, and 4A-B, the data structure can specify as excluded components conjunctions ("and," "but," and "or"), articles (e.g., "a,", "an," and "the"), prepositions (e.g., "in," "of," "about," and "from"), and commonly used words in Web document titles (e.g., "Home" and "Page"). It is also preferred that the user be provided with mechanisms for specifying that two adjacent components be parsed as a single component. For example, the user can specify that "United States" is a single component and cannot be parsed into the components "United" and "States." Thus, in the preferred embodiment, the title "United States Patent and Trademark Office" is parsed into the components "United States," "Patent," "Trademark," and "Office." From step 1304 (FIG. 13), processing transfers to loop step 1306 which, in conjunction with next step 1314, defines a loop in which each of the components of the description of the user-generated signals are processed. During each iteration of the loop defined by loop step 1306 and next step 1314, the component processed is called the subject component. Once each component has been processed according to the loop defined by loop step 1306 and next step 1314, processing transfers from loop step 1306 to terminal step 1316 in which processing according to logic flow diagram 1300 terminates. For each component, data parser 1104 (FIG. 11) transmits to a history element builder 1106 the subject component, the description, and the user-generated signals and processing transfers from loop step 1306 to step 1308.

In step 1308, history element builder 1106 builds a specific description from the description of the user data and the subject component. In one embodiment, history element builder 1106 builds the specific description by concatenating the component and the description of the user data and delimiting them, e.g., with a colon. For example, if the subject component is "allmystuff.*" and the description is "ls -Fl allmystuff.*," the specific description is "allmystuff.*: ls -Fl allmystuff.*." Alternatively, history element builder 1106 uses the description of the user-generated signals as the specific description without modification. Processing transfers from step 1308 (FIG. 13) to step 1310.

In step 1310, history element builder 1106 (FIG. 11) constructs, from the specific description and the user data, a history element and stores the history element in history database 804. The specific structure of the history element constructed depends on the particular structure of history database 804. For example, if history database 804 is of the structure of history database 804A (FIG. 9), history element builder 1106 (FIG. 11) constructs history element 912 (FIG. 9) and stores the specific description in description field 908 and the user data in data field 910. History element builder 1106 adds history element 912 to list 906A of history elements. If history database 804 is of the structure of history database 804B (FIG. 10), history element builder 1106 (FIG. 11) searches list 1006 for a secondary head link whose item description field contains the subject component. If such a secondary head link is found, history element builder 1106 adds to the list 1016 of history elements associated with the secondary head link a history element 1018 in which the description is stored in description field 1008 and in which the user data are stored in data field 1010. Conversely, if no such secondary head link is found, history element builder 1106 constructs history element 1018 in which the description is stored in description field 1008 and in which the user data are stored in data field 1010, includes history element 1018 in a list 1016 whose length is one, associates list 1016 with a item description field 1014 which is the subject component to form a secondary head link 1012, and adds secondary head link 1012 to a list 1006 of secondary head links.

It is preferred that subsequent generation of previously generated user data does not result in redundant or duplicate history elements stored in history database 804. Therefore, it is preferred that a history element representing user data is stored in history database 804 only if no history element representing the same user data and having the same specific description is already stored in history database 804. If history database 804 includes a history element representing the same user data but having a different specific description, it is preferred that the new history element is added to history database 804. Including in history database 804 history elements representing the same user data but having different specific descriptions is encouraged since it is generally unclear which specific description will be more memorable to a specific user. It is appreciated that other actions can be taken when storage of a new history element with an equivalent description field or data field with a previously stored history element is attempted. For example, (i) the new history element can be stored in the history database and supersede any previously stored history element, (ii) the new history element can be timestamped to distinguish the previously stored history element and can be stored in the history database without superseding the previously stored history element, or (iii) the user can be presented with various options, including those described above, and the option selected by the user can be carried out.

From step 1310 (FIG. 13), processing transfers through next step 1314 to loop step 1306 in which the next component of the description of the user data is processed according to the loop of steps 1306-1314. As described above, once all components have been processed according to the loop of steps 1306-1314, processing transfers from loop step 1306 to terminal step 1316 in which processing according to logic flow diagram 1300 terminates. Thus, according to logic flow diagram 1300, user data whose description is "ls -Fl allmystuff.*" are represented in history database 804 by history links whose respective descriptions are "ls: ls -Fl allmystuff.*" and "allmystuff.*: is -Fl allmystuff.*." Since history links are automatically stored according to the initial letter of each component of the description as described above, these history links are stored in lists of history elements corresponding to the letters "L" and "A," respectively. Similarly, user data whose description is "United States Patent and Trademark Office" are represented in history database 804 by history links stored under secondary head links whose item descriptions are "United States," "Patent," "Trademark," and "Office" which are stored in lists of secondary head links associated with the letters "U," "P," "T," and "O," respectively. As described above, letters of the alphabet are elements of the description of the user data and are therefore symbols of the user data. Furthermore, the initial letter of each component is generally prominent relative to other symbols of the user data. Thus, the user can recall the previously generated user data by recalling any of a number of prominent symbols of, e.g., the initial letter of any of the components of the description, of the previously generated user data.

The above description is illustrative only and is not limiting. The present invention is limited only by the claims which follow.

What is claimed is:

1. A method for recalling previously generated user data in a computer which includes a memory, the method comprising:

generating user data in response to signals generated by a user;

recording the user data in the memory;

associating with the user data a description of the user data wherein the description comprises one or more instances of each of one or more elements of a collection of two or more elements;

forming two or more categories corresponding respectively to two or more of the elements; and associating the user data with a selected one of the categories, which corresponds to a selected one of the elements, wherein one or more instances of the selected element are part of the description of the user data; and recalling the user data from memory, the step of recalling comprising:

receiving signals which are generated by a first gesture of the user and which specify the selected category; and receiving data selection signals which are generated by a second gesture of the user and which identify the user data within the selected category.

2. The method of claim 1 wherein the elements are symbols of the user data.

3. The method of claim 1 wherein the two or more elements to which the categories correspond are prominent symbols of the user data.

4. The method of claim 1 wherein the elements are letters of an alphabet.

5. The method of claim 1 wherein the two or more elements to which the categories correspond are letters of an alphabet.

6. The method of claim 1 wherein one or more descriptions of associated respective user data are associated with the selected category and include the description;

further wherein the step of receiving data selection signals comprises:

representing, in a computer display, the one or more descriptions associated with the selected category.

7. A history apparatus for use in a computer system which includes a computer processor and a memory operatively coupled to the computer processor, the history apparatus comprising:

a user interface which converts signals generated by a user to user data which is stored in the memory and which has a user data description, the user data description comprising one or more instances of one or more selected elements of a collection of two or more elements;

a history database, operatively coupled to the user interface, the history database comprising two or more categories, each of which is associated with a respective one of two or more elements of the collection;

a user data classifier, operatively coupled between the user interface and the history database, for storing the user data in the history database in a selected one of the categories which is associated with one of the selected elements; and a user data retriever, operatively coupled to the history database, for retrieving user data from the history database, the user data retriever comprising:

a category selector, which is operatively coupled to the user interface and which specifies, in response to signals generated by a category selection gesture of the user, a selected one of the two or more categories; and a user data selector, which is operatively coupled to the user interface and which specifies, in response to signals generated by a user data selection gesture of the user, selected user data of the select category.

8. The apparatus of claim 7 wherein the elements are symbols of the user data.

9. The apparatus of claim 7 wherein the two or more elements with which the categories are associated are prominent symbols of the user data.

10. The apparatus of claim 7 wherein the elements are letters of an alphabet.

11. The apparatus of claim 7 wherein the two or more elements with which the categories are associated are letters of an alphabet.

12. The apparatus of claim 7 further comprising:

a parser, operatively coupled to the user interface, for parsing from the user data description a description component which comprises one or more instances of one or more component elements of the collection of two or more elements;

wherein the selected category is associated with one of the component elements.

13. The history apparatus of claim 7 wherein one or more descriptions of associated respective user data are associated with the selected category and include the description;

further wherein the user data selector comprises:

a description display module which represents, in a computer display, the one or more descriptions associated with the selected category.

14. A computer readable memory which includes a history apparatus, the history apparatus comprising:

a user interface which converts signals generated by a user to user data which is stored in the memory and which has a user data description, the user data description comprising one or more instances of one or more selected elements of a collection of two or more elements;

a history database, operatively coupled to the user interface, the history database comprising two or more categories, each of which is associated with a respective one of two or more elements of the collection; and a user data classifier, operatively coupled between the user interface and the history database, for storing the user data in the history database in a selected one of the categories which is associated with one of the selected elements; and a user data retriever, operatively coupled to the history database, for retrieving user data from the history database, the user data retriever comprising:

a category selector, which is operatively coupled to the user interface and which specifies, in response to signals generated by a category selection gesture of the user, a selected one of the two or more categories; and a user data selector, which is operatively coupled to the user interface and which specifies, in response to signals generated by a user data selection gesture of the user, selected user data of the select category.

15. The memory of claim 14 wherein the elements are symbols of the user data.

16. The memory of claim 14 wherein the two or more elements with which the categories are associated are prominent symbols of the user data.

17. The memory of claim 14 wherein the elements are letters of an alphabet.

18. The memory of claim 14 wherein the two or more elements with which the categories are associated are letters of an alphabet.

19. The memory of claim 14 wherein the history apparatus further comprises:

a parser, operatively coupled to the user interface, for parsing from the user data description a description component which comprises one or more instances of one or more component elements of the collection of two or more elements;

wherein the selected category is associated with one of the component elements.

20. The memory of claim 14 wherein one or more descriptions of associated respective user data are associated with the selected category and include the description;
further wherein the user data selector comprises:
a description display module which represents, in a computer display, the one or more descriptions associated with the selected category.

21. A computer system comprising:

a computer processor;

a memory, operatively coupled to the computer processor and including a history apparatus which in turn comprises:
a user interface which converts signals generated by a user to user data which is stored in the memory and which has a user data description, the user data description comprising one or more instances of one or more selected elements of a collection of two or more elements;
a history database, operatively coupled to the user interface, the history database comprising two or more categories, each of which is associated with a respective one of two or more elements of the collection; and
a user data classifier, operatively coupled between the user interface and the history database, for storing the user data in the history database in a selected one of the categories which is associated with one of the selected elements; and
a user data retriever, operatively coupled to the history database, for retrieving user data from the history database, the user data retriever comprising:
a category selector, which is operatively coupled to the user interface and which specifies, in response to signals generated by a category selection gesture of the user, a selected one of the two or more categories; and
a user data selector, which is operatively coupled to the user interface and which specifies, in response to signals generated by a user data selection gesture of the user, selected user data of the select category.

22. The computer system of claim 21 wherein the elements are symbols of the user data.

23. The computer system of claim 21 wherein the two or more elements with which the categories are associated are prominent symbols of the user data.

24. The computer system of claim 21 wherein the elements are letters of an alphabet.

25. The computer system of claim 21 wherein the two or more elements with which the categories are associated are letters of an alphabet.

26. The computer system of claim 21 wherein the history apparatus further comprises:
a parser, operatively coupled to the user interface, for parsing from the user data description a description component which comprises one or more instances of one or more component elements of the collection of two or more elements;
wherein the selected category is associated with one of the component elements.

27. The computer system of claim 21 wherein one or more descriptions of associated respective user data are associated with the selected category and include the description;
further wherein the user data selector comprises:
a description display module which represents, in a computer display, the one or more descriptions associated with the selected category.

* * * * *